US011527025B2

(12) United States Patent
Abi-Rached et al.

(10) Patent No.: US 11,527,025 B2
(45) Date of Patent: Dec. 13, 2022

(54) MULTI SOURCE GEOGRAPHIC INFORMATION SYSTEM (GIS) WEB BASED DATA VISUALIZATION AND INTERACTION FOR VEGETATION MANAGEMENT

(71) Applicant: General Electric Company, Schenectady, NY (US)

(72) Inventors: Habib K Abi-Rached, San Ramon, CA (US); Achalesh Kumar, San Ramon, CA (US); Arpit Jain, Dublin, CA (US); Mohammed Yousefhussien, Clifton Park, NY (US); Tapan Shah, Stanford, CA (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 9 days.

(21) Appl. No.: 17/091,748

(22) Filed: Nov. 6, 2020

(65) Prior Publication Data
US 2021/0142537 A1    May 13, 2021

Related U.S. Application Data

(60) Provisional application No. 62/932,676, filed on Nov. 8, 2019.

(51) Int. Cl.
*G06T 11/20*    (2006.01)
*G06N 20/00*    (2019.01)
(Continued)

(52) U.S. Cl.
CPC ............ *G06T 11/206* (2013.01); *G06N 20/00* (2019.01); *G06Q 10/0635* (2013.01);
(Continued)

(58) Field of Classification Search
None
See application file for complete search history.

(56) References Cited

U.S. PATENT DOCUMENTS 7,739,138 B2    6/2010    Chauhan et al.
8,352,410 B2    1/2013    Rousselle et al.
(Continued)

FOREIGN PATENT DOCUMENTS

KR        101637969 B1    7/2016
WO        2015112892 A1   7/2015
WO        2017021751 A1   2/2017

OTHER PUBLICATIONS

Leite, Jonatas Boas, et al. "Resiliency assessment in distribution networks using GIS-based predictive risk analytics." IEEE Transactions on Power Systems 34.6 (Apr. 2019): 4249-4257.*
(Continued)

*Primary Examiner* — Ryan M Gray
(74) *Attorney, Agent, or Firm* — Buckley, Maschoff & Talwalkar LLC

(57) ABSTRACT

According to some embodiments, a system and method are provided comprising a vegetation management module to receive image data from an image source; a memory for storing program instructions; a vegetation management processor, coupled to the memory, and in communication with the vegetation module, and operative to execute program instructions to: receive first image data and second image data for an area of interest; overlay the first image data over the second image data to generate an overlaid image; receive feeder attribute data for at least one feeder in the overlaid image; generate a risk score for the at least one feeder based in part on the received feeder attribute data; and generate a visualization based on the at least one feeder and the generated risk score. Numerous other aspects are provided.

20 Claims, 14 Drawing Sheets

(51) Int. Cl.
*G06Q 10/06* (2012.01)
*G06T 11/60* (2006.01)
*G06V 20/10* (2022.01)

(52) U.S. Cl.
CPC . *G06Q 10/06312* (2013.01); *G06Q 10/06315* (2013.01); *G06T 11/60* (2013.01); *G06V 20/188* (2022.01)

(56) References Cited

U.S. PATENT DOCUMENTS

| | | | |
|---|---|---|---|
| 9,297,723 B1 | 3/2016 | Hofmann et al. | |
| 10,032,267 B2* | 7/2018 | Strebel | G01S 7/4802 |
| 10,614,307 B2* | 4/2020 | Stanley | G01B 11/28 |
| 2012/0169498 A1* | 7/2012 | Leppanen | G06V 20/188 |
| | | | 702/2 |
| 2012/0215729 A1* | 8/2012 | Johnson | A01G 7/00 |
| | | | 706/45 |
| 2014/0257862 A1* | 9/2014 | Billman | G06Q 40/08 |
| | | | 705/4 |
| 2015/0262110 A1 | 9/2015 | Henriques et al. | |
| 2015/0317740 A1* | 11/2015 | Emison | G06Q 40/08 |
| | | | 705/4 |
| 2016/0343093 A1* | 11/2016 | Riland | G06Q 10/04 |
| 2017/0277953 A1 | 9/2017 | Stanley | |
| 2018/0035606 A1* | 2/2018 | Burdoucci | H04N 5/232935 |
| 2018/0046910 A1 | 2/2018 | Greene | |
| 2018/0098137 A1 | 4/2018 | Saha et al. | |
| 2019/0228362 A1* | 7/2019 | Anagnostou | G06N 20/00 |
| 2020/0250424 A1* | 8/2020 | Klein | G06Q 40/08 |
| 2021/0142559 A1* | 5/2021 | Yousefhussien | G06V 20/188 |

OTHER PUBLICATIONS

Radmer, Duane T., et al. "Predicting vegetation-related failure rates for overhead distribution feeders." IEEE Transactions on Power Delivery 17.4 (2002): 1170-1175.*

Brewer, C. Kenneth et al., "Multi-Source and Multi-Classifier System for Regional Landcover Mapping", IEEE Workshop on Advances in Techniques for Analysis of Remotely Sensed Data, May 4, 2004, (pp. 143-149, 7 total pages).

Stojanova, Daniela et al., "Estimating vegetation height and canopy cover from remotely sensed data with machine learning", Ecological Informatics, vol. 5, Issue 4, (Jul. 2010), DOI:10.1016/j.ecoinf.2010.03.004, (pp. 256-266, 11 total pages).

International Search Report and Written Opinion dated Feb. 22, 2021 which was issued in connection with a counterpart PCT Application No. PCT/US20/59428.

Zhengrong Li: Aerial image analysis using spiking neural networks with application to power line corridor monitoring:, May 1, 2011 (May 1, 2011), Retrieved from the Internet: http://http://eprints.qut.edu.au/46161/1/Zhengrong_Li_Thesis.pdf [retrieved on Mar. 29, 2016].

* cited by examiner

Aerial image based tree segmentation

Aerial image with vegetation heat map

Tree height map based upon satellite

MULTI SOURCE GEOGRAPHIC INFORMATION SYSTEM (GIS) WEB BASED DATA VISUALIZATION AND INTERACTION FOR VEGETATION MANAGEMENT

The present application claims priority from the following U.S. Provisional Patent Application, which is hereby incorporated by reference herein in its entirety for all purposes:

U.S. Provisional Patent Application Ser. No. 62/932,676, filed Nov. 8, 2019, and entitled "MULTISOURCE GEOGRAPHIC INFORMATION SYSTEM (GIS) WEB BASED DATA VISUALIZATION AND INTERACTION FOR VEGETATION MANAGEMENT".

CROSS REFERENCE TO RELATED APPLICATION

The present application is related to U.S. patent application Ser. No. 17/091,725, filed Nov. 6, 2020, entitled "SYSTEM AND METHOD FOR VEGETATION MODELING USING SATELLITE IMAGERY AND/OR AERIAL IMAGERY", which claims priority to U.S. Provisional Patent Application Ser. No. 62/932,679, filed Nov. 8, 2019, entitled "SYSTEM AND METHOD FOR VEGETATION MODELING USING SATELLITE IMAGERY AND/OR AERIAL IMAGERY", both of which are hereby incorporated herein by reference in their entirety for all purposes.

BACKGROUND

Vegetation management is important to maintain reliable power distribution, as appropriate vegetation management may prevent forest fires and unexpected power shutdown due to vegetation related incidences, which may be very costly. A utility company may provide the power via power lines. As part of vegetation management, the utility company may determine the proximity of the vegetation to the power lines. Decision making regarding the proximity of the vegetation and how to manage it may be important when it comes to minimizing the number of outages due to vegetation, preventing forest fires and disruption of the power.

It would be desirable to provide systems and methods to improve vegetation management.

SUMMARY

According to some embodiments, a system is provided including a vegetation management module to receive image data from an image source; a memory for storing program instructions; a vegetation management processor, coupled to the memory, and in communication with the vegetation module, and operative to execute program instructions to: receive first image data and second image data for an area of interest; overlay the first image data over the second image data to generate an overlaid image; receive feeder attribute data for at least one feeder in the overlaid image; generate a risk score for the at least one feeder based in part on the received feeder attribute data; and generate a visualization based on the at least one feeder and the generated risk score.

According to some embodiments, a method is provided including receiving first image data and second image data for an area of interest; overlaying the first image data over the second image data to generate an overlaid image; receiving feeder attribute data for at least one feeder in the overlaid image; generating a risk score for the at least one feeder based in part on the received feeder attribute data; generating a visualization based on the at least one feeder and the generated risk score; and generating a trim schedule for at least one feeder based on the generated risk score.

According to some embodiments, a non-transient computer-readable medium storing instructions to be executed by a processor to perform a method including receiving first image data and second image data for an area of interest; overlaying the first image data over the second image data to generate an overlaid image; receiving feeder attribute data for at least one feeder in the overlaid image; generating a risk score for the at least one feeder based in part on the received feeder attribute data; generating a visualization based on the at least one feeder and the generated risk score; and generating a trim schedule for at least one feeder based on the generated risk score.

A technical effect of some embodiments of the invention is an improved and/or computerized technique and system for vegetation management via a web-based Geographic Information System (GIS) data visualization and interactive module. One or more embodiments provide for vegetation risk detection and vegetation trimming prioritization, as well as improved reliability for trimming schedules, taking difficult terrain and hard to access areas into account. One or more embodiments provide for location-based trim schedules and improved forecasting of vegetation trimmings, which may reduce costs for upcoming cycle trims on the same resource conduits ("feeders"). One or more embodiments provide for the generation of a risk score for each feeder, where the risk score may indicate the likelihood the feeder will experience an outage in a given amount of time. A cluster may be created based on a given area, and the amount of a given risk score in that given area. A vegetation trimming schedule may then be based on the risk for a given cluster (i.e., spatial location plus risk together may determine whether and when vegetation needs to be trimmed along a given feeder). One or more embodiments may provide for automated reviews of vegetation trimming. One or more embodiments provide for the fusion of multiple sources of information to compute vegetation trim cycles and manage risk of a utility outage. One or more embodiments provide a web-based, thus platform independent, vegetation management module that allows the operator to access and interact with, in real-time, vegetation data, weather data, electrical asset data, work order data, and historical outage data, etc. while visualizing diverse data, such as satellite and analytics outputs on GIS maps. One or more embodiments provide software and system architecture to provide real time 3D visualizations of a terrain and a utility supply scheme. The vegetation management module may provide on-demand visualization to bring diverse independent information in a scalable manner (e.g., satellite, weather, assets, analytics, etc.) on a GIS map. Embodiments provide for a scalable, interactive and unified user experience. One or more embodiments provide a single interface for visualizing all the relevant data for a vegetation trimming schedule and may automatically generate work orders to manage the vegetation trimming. In one or more embodiments, the system may automatically prioritize work orders based on various data parameters selected by an operator.

In one or more embodiments, the parameters may interact with each other in the visualization so that any interaction with one data point may automatically update connected data points on other parameters. As a non-exhaustive example, when "previous outages" are filtered based on a field "vegetation," all of the outages on a map which are not vegetation related may be removed and the visualization may only show relevant outages. A vegetation trimming priority table may also be automatically updated based on the "vegetation" information. One or more embodiments may generate priority order for vegetation trimming based on satellite, weather, prior trim date and other data. Significant saving of resources and money may be provided by one or more embodiments via the use of the vegetation management module by providing a better optimized vegetation trimming schedule as compared to conventional trimming schedules. Conventional trimming schedules are fixed (e.g., trim the vegetation every four years). One or more embodiments may provide for better planning of resources and expected work by moving away from a fixed-vegetation trimming schedule to a need-based/feeder-based vegetation trimming schedule.

The interface provided by one or more embodiments may be a single interface to access different information related to the vegetation trimming schedule, which may avoid the use of different software for visualizing different data. One or more embodiments may also provide an operator with feeder overlaps to avoid scheduling a trim of the same area twice. The vegetation management module may highlight those areas on a map where there are overlaps between circuits or distribution lines. One or more embodiments may also automatically update the regions which have been exposed to vegetation trimming as a result of other work orders (e.g., road expansion or construction), and incorporate that information to update the trim schedule, which may provide a savings of resources for the utility organizations. The updated information may be provided to the operator visually on a map displayed in the interface.

With this and other advantages and features that will become hereinafter apparent, a more complete understanding of the nature of the invention can be obtained by referring to the following detailed description and to the drawings appended hereto.

Other embodiments are associated with systems and/or computer-readable medium storing instructions to perform any of the methods described herein.

DRAWINGS

DETAILED DESCRIPTION

Figure 1:
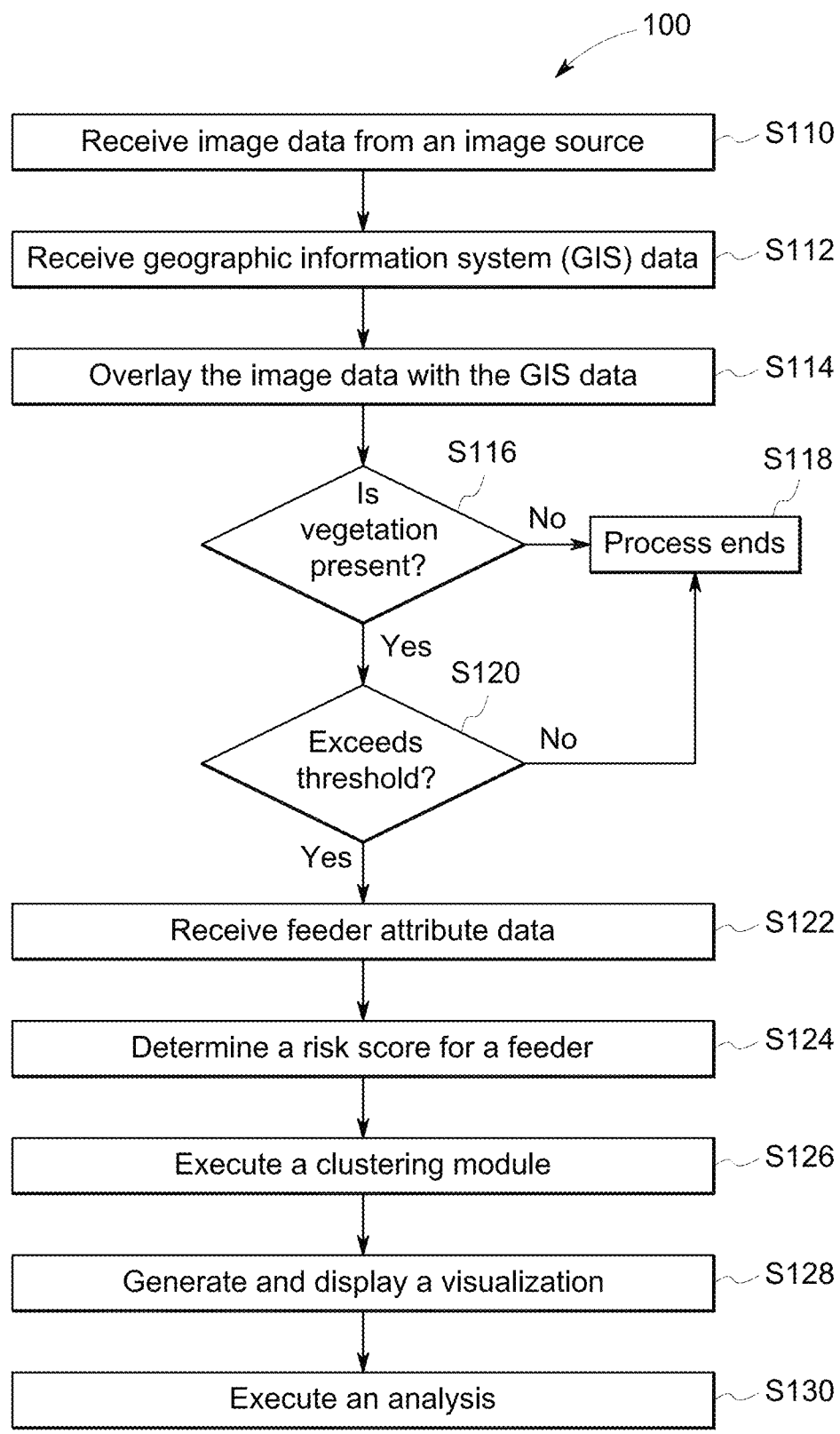
FIG. 1 illustrates a flow diagram according to some embodiments.

Vegetation management is important to maintain reliable power distribution, as appropriate vegetation management (e.g., vegetation trimming) may prevent forest fires, and unexpected power shutdown due to vegetation related incidences. Current approaches to vegetation management are primarily based on fixed trimming schedules (e.g., trim an area every two or four years) in combination with reactive trimming based on outages and customer complaints. With fixed trimming schedules, the utility company does not know the underlying status of the amount of vegetation growth or whether the vegetation are even still there. As used herein, the term "trees" and "vegetation" may be used interchangeably, although "vegetation" may also refer to shrubs, bushes and grasses. One or more embodiments may provide a more efficient and proactive process for vegetation management (e.g., trim a particular area earlier because of the vegetation growth, do not trim in a particular area because the trees aren't encroaching powerlines or other assets or have been cut/fallen, etc.) and the allocation of resources (e.g., send a team to trim Area X, not Area Y). Embodiments may improve the trim cycle of the "transmission and resource distribution providers" by providing analytical data to plan in advance and distribute resources based on need. Embodiments may reduce unnecessary trimming schedules and facilitate redeployment of resources to trim trees in risky regions.

In one or more embodiments, a vegetation management module may be a web-based, GIS data visualization and interaction tool for vegetation management. The web-based aspect may make the vegetation management module available to an operator sitting anywhere in the world. In one or more embodiments, the vegetation management module may be deployed on a cloud. The vegetation management module may provide a visual interface that agglomerates a plurality of information provided by multiple data sources (e.g., databases) in a unified visualization to provide a user with an intuitive understanding of the causality between the multiple sources of data, as well as the risk of outage of the utility caused by the vegetation. The risk of outage may inform decision making with respect to managing the vegetation. In one or more embodiments, the data sources may be diverse and independent. The visualization may be modular, and a user/operator may easily add/remove different features and their interactions with each other from the visualization. One or more embodiments may be structured so user/operators have the appropriate level of access to information. In one or more embodiments, the same platform on which the vegetation management module resides may be leveraged to offer services to multiple clients simultaneously.

Non-exhaustive examples of data sources include asset and asset-related information, weather data (e.g., extreme wind conditions, wind direction, wind pressure, wind gust, snow, rain temperatures, etc.), multiple satellite inputs (e.g., Normalized Difference Vegetation Index (NDVI)), satellite data based vegetation analytics, work orders (e.g., last trimming date and next trimming date), number of customers affected, and historical data of vegetation-related outages. The vegetation management module may use one or more visualization tools including, but not limited to, parallel coordinates and sortable tables, to interact with each other, and with data displayed on a map. The visualization tools may provide an accurate status of vegetation and may assist an operator in making informed decisions. The vegetation management module may, in one or more embodiments, provide the operator with visibility of the vegetation status and decision support to manage vegetation by scheduling vegetation trimming proactively and optimally. The vegetation management module may enable the operator to plan vegetation trimming schedules at the asset/feeder level, and move away from fixed scheduling, budget and distribution of resources, and instead move to need-based planning. The vegetation management module may include one or more interactive filters that may provide prioritization of vegetation trimming and situational awareness with respect to the vegetation status in an area of interest.

In one or more embodiments, the vegetation management module may provide a map (which may be displayed on a user interface). The map may show all the asset and asset-related information geographically. As used herein, the feeder may be a non-exhaustive example of an asset. The map may be overlaid with layers of relevant information obtained from other data sources or may highlight assets which need attention depending on the task. The features on the map may interact with each other in real-time so that any update on one feature may lead to updates on the other features which have related data. In one or more embodiments, the map may include a heat map component to indicate predictions of risk scores indicating the risk of utility outage due to vegetation, so that a user may prioritize vegetation trimming. In one or more embodiments, the vegetation management module may use machine learning (ML) techniques to incorporate information on the location of vegetation from satellites, the number of outages that have occurred, the duration of the outages, and how the feeder experienced the outage, to generate a risk score associated with each feeder. Then, based on the risk score, the vegetation management module may suggest the feeder with the highest risk score be trimmed before feeders with lower risk scores. As used herein, "feeder" may refer to an electrical/distribution line or medium that runs along some geographical location to deliver electricity or other resources to one or more houses, businesses or other structures. A feeder may include one or more segments. The segments may be separated by poles (e.g., Feeder 1 has two feeder segments: segment 1 between pole 1 and pole 2, and segment 2 between pole 2 and pole 3). It is noted that different kinds of power (e.g., 15 kV, 34 kV) may be delivered through the feeder. The feeder connects multiple houses/businesses/structures together, for example. The idea is that if a tree that falls on a segment of the feeder, and the segment is broken, all of the houses/businesses on that feeder are affected by that current interruption. In other words, a feeder may be like a closed circuit in that if at any point the feeder is disrupted, all of the houses/businesses on that feeder are disrupted. While the examples described herein are in relation to feeders providing electricity, Applicant notes that this is a non-exhaustive example, and the systems and processes described herein may be applied to vegetation trimming related to other resource delivery mediums. The vegetation management module may also, in one or more embodiments, generate one or more risk clusters, and determine a trim schedule based on the clusters. Conventionally, when a team is sent out to trim vegetation, the team is instructed to trim every feeder connected to a substation (i.e., electrical generation, transmission, and distribution system where multiple feeders originate) so that everything nearby a given feeder and associated with the substation is trimmed, whether it needs to be trimmed or not. This conventional process avoids the team (and the associated machinery etc.) having to be sent to this area again. This conventional process may waste time and resources trimming feeders that are low risk. One or more embodiments provide for the feeders in a cluster to be trimmed because they are at a same risk level (e.g., high) and are relatively close together. As such, embodiments provide for all of the high risk feeders to be trimmed in an area, instead of the conventional process of trimming feeders in an area attached to a substation that may not need to be trimmed.

The vegetation management module may provide interactive insights between the heat map (risk model) and the multiple sources of data, which then may be used by the operator to manage the vegetation.

Turning to FIGS. 1-11, flow diagrams 100 (FIG. 1) and associated diagrams, of an example of operation according to some embodiments is provided. In particular, FIG. 1 provides a flow diagram of a process 100, according to some embodiments. Processes 100, and any other process described herein, may be performed using any suitable combination of hardware (e.g., circuit(s)), software or manual means. For example, a computer-readable storage medium may store thereon instructions that, when executed by a machine, result in performance according to any of the embodiments described herein. In one or more embodiments, the system 600 is conditioned to perform the process 100 such that the system is a special-purpose element configured to perform operations not performable by a general-purpose computer or device. Software embodying these processes may be stored by any non-transitory tangible medium including a fixed disk, a floppy disk, a CD, a DVD, a Flash drive, or a magnetic tape. Examples of these processes will be described below with respect to embodiments of the system, but embodiments are not limited thereto. The flow chart(s) described herein do not imply a fixed order to the steps, and embodiments of the present invention may be practiced in any order that is practicable.

In one or more embodiments, the vegetation management module 202 may include a ML module 204. Prior to the start of the process 100, the ML module 204 may train one or more machine learning models with vegetation modeling analytics and satellite/aerial/other data to: automatically identify each pixel in an image as being a tree vs not-tree; generate a height map showing the height of vegetation; identify whether the vegetation is healthy vs not healthy; generate one or more tree Key Performance Indicators (KPI) (e.g., feeder length, area, volume); determine which species the vegetation belongs to (e.g., if hyperspectral data is available, for example); and determine a risk score for the feeder. Other suitable vegetation modeling analytics may be used to train the ML models.

The training procedure may be supervised, semi-supervised or unsupervised. In unsupervised training, the process may, for example, identify each pixel as belonging to a tree/not a tree category without being taught what to look for explicitly. In semi-supervised training, only part of the data is labeled, and the rest are unlabeled and the model learns to predict the class of each pixel by a little supervision coming from labeled data and leveraging large unlabeled data to augment training. The goal of the supervised training is to learn a representation so as to minimize the error in predicting the desired category. The process to model the data may be based on deep learning networks, and in particular artificial neural networks or traditional learning based on hand-crafted feature and learning techniques, including, but not limited to, Support Vector Machine, Random Forest, Boosting, etc. As a non-exhaustive example, a variant of an artificial neural network called Convolution Neural Network (CNN) may be used to produce state of the art results for image data. The variant (e.g., type of CNN algorithm) may be Residual-Unet or any other suitable CNN architecture. The variant may identify a category of each pixel in the image.

In one or more embodiments, the ML module 204 may use a Machine Learning (ML) technique called "survival modeling" to compute a risk score 206. Other suitable techniques may be used. As described above, the ML module 204 may operate in two stages: 1. Training and 2. Evaluating. With training, the ML module 204 may collect certain historical attribute data for each feeder (e.g., for a given outage—the number of customers impacted and the duration of the outage, in addition to the number of customers impacted the previous year by outages, the population density, estimation of outages in the previous year, time since last trimming etc.). For example, Jan. 1, 2019 historical attribute information is collected for Feeder 1. It is noted that the conventional vegetation trimming schedule is for a pre-set time (e.g., every four years), that may be set by an individual utility company, so if the collected historical data is conventional and the utility company has a trimming schedule of every four years, the time since the last trimming should be less than or equal to four years. Multiple attributes are collected for each feeder, including the corresponding information that a given feeder actually suffered an outage at X time. As used herein, "attribute data" may include factors affecting a feeder's risk profile: They are a) reliability measures like Customers impacted, #outages etc., b) environmental attributes like vegetation density, weather variables etc. and c) operational factors like number of customers, time since last trim etc. When training an ML risk model 226, historical attribute data for multiple feeders is collected—the one with the outage, as well as other feeders that did not have outages at this time. The ML technique may then be used to build the ML risk model 226 based on the historical attribute data. The ML risk model 226 may map the attributes to a risk score 206 that indicates how likely it is that the feeder will suffer an outage at this instant. After the ML risk model 226 is generated, the ML risk model 226 may be applied to any new feeder in the evaluation stage so that the new feeder attributes may be mapped to a risk score 206. The ML risk model 226 may then be used to evaluate new feeders. Continuing with the example, on Jan. 23, 2019, a new feeder is to be evaluated. The attributes associated with the new feeder may be input to the ML risk model 226, and the ML risk model 226 may output the risk score 206 based on the attribute mapping. The ML risk model 226 may determine a distribution of feeders with certain attributes may have a higher risk score, and a feeder with different attributes may have a lower risk score. It is noted that in addition to different attributes/attribute categories that may affect the risk score, the values for those attribute categories may also affect the risk score. For example, if a feeder has very large vegetation density, it may have a high-risk score. Also, if a feeder in a previous year has a large number of customers affected by an outage, it may have a high risk score.

Figure 3:
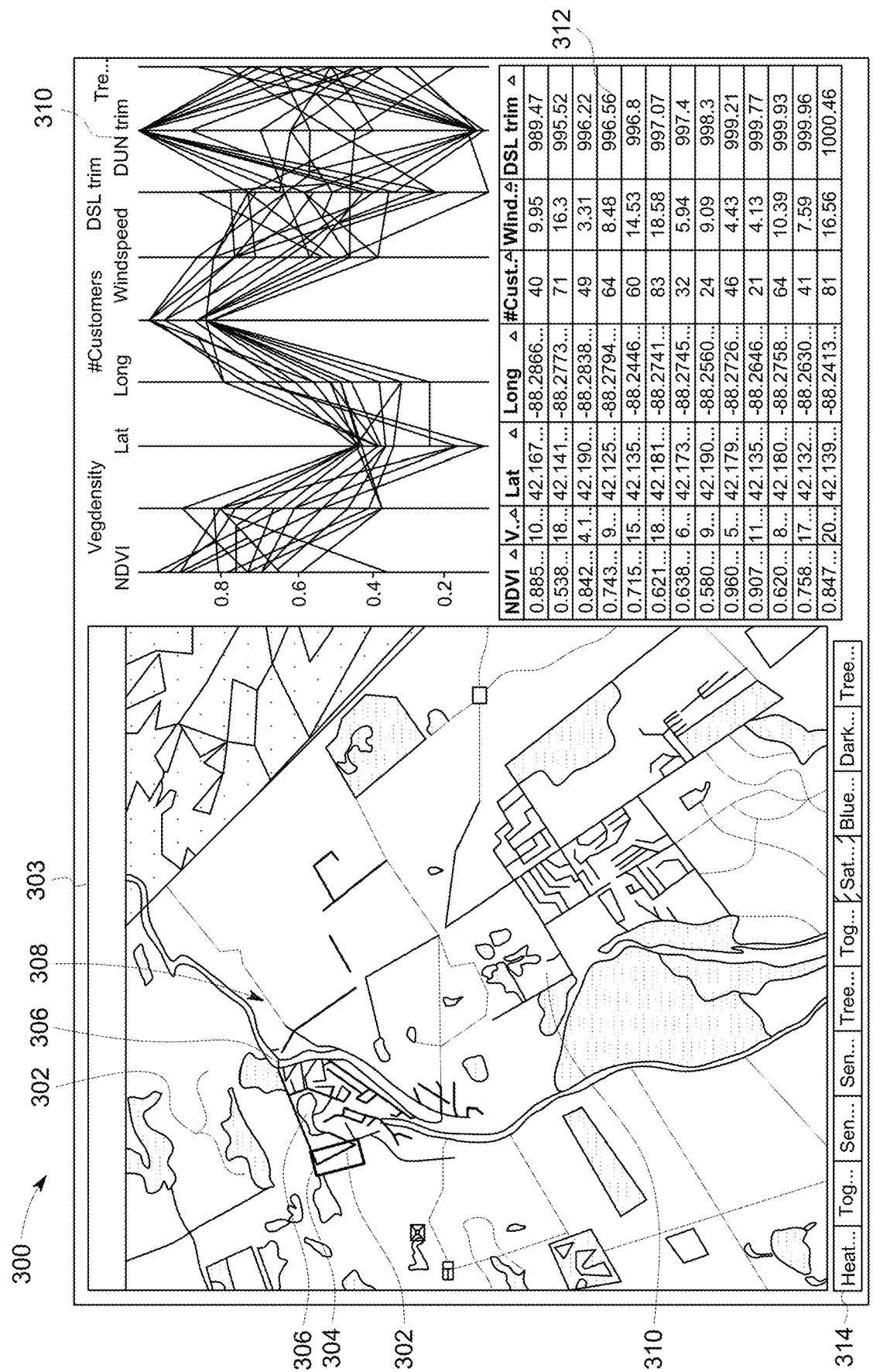
FIG. 3 illustrates a non-exhaustive example of a user interface according to some embodiments.
Figure 4:
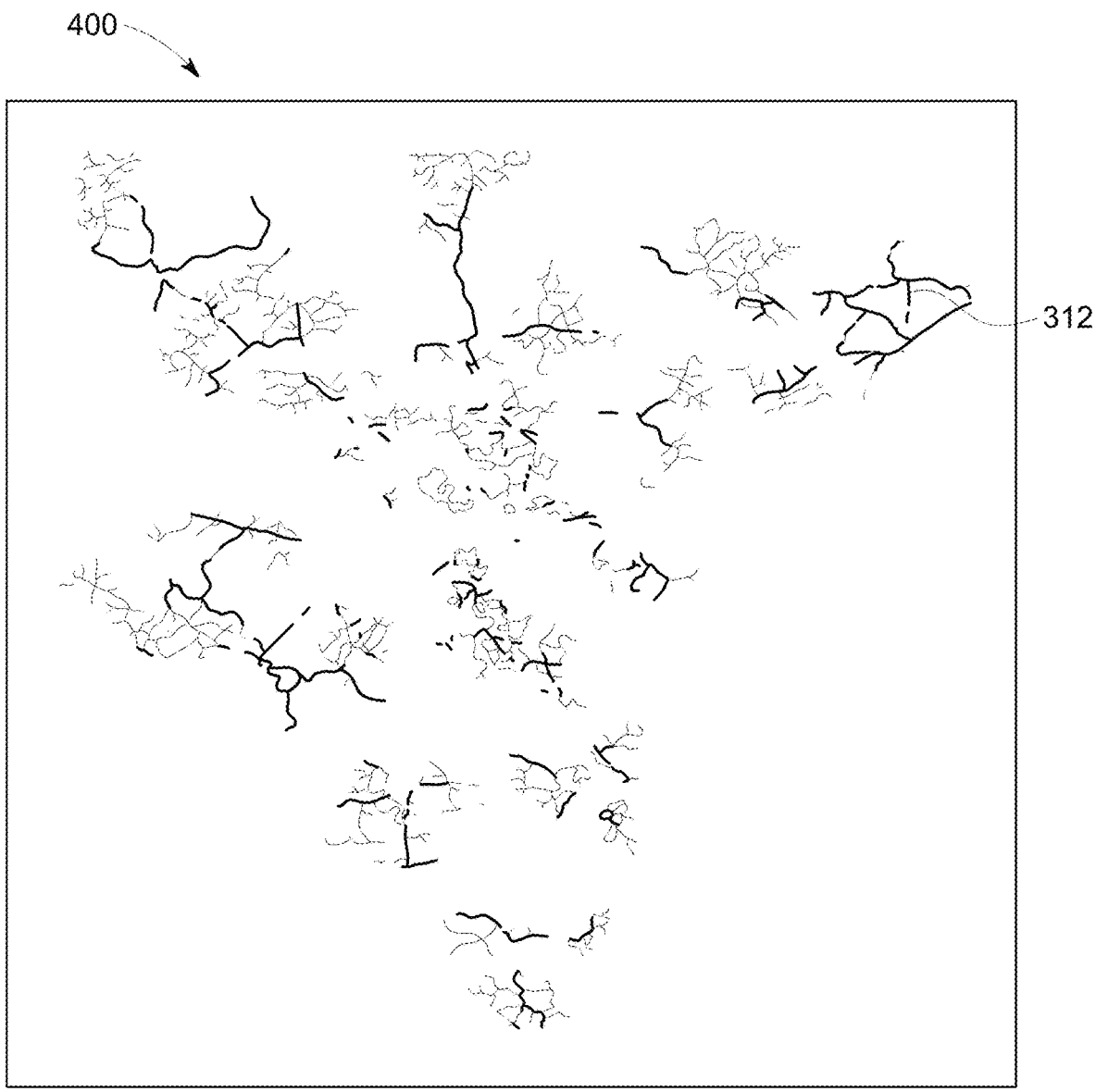
FIG. 4 illustrates a non-exhaustive example of a graph according to some embodiments.

Initially, at S110, image data 201 is received at the vegetation management module 202 from at least one image source 203 for a given area of interest (AOI) 308 (FIG. 3). The image source 203 may be government agencies or commercial satellite data providers. The image data 201 may be at least one of satellite and aerial image data, LiDAR data, or any other suitable data. The image data 201 received from different sources may be at a same resolution or a different resolution as compared to each other. With the satellite data, the image data may be a result of multi-resolution satellite fusion that is a result of up-sampling and feature based alignment, including analytics to combine multi-resolution satellite data which are at different frequencies. The image data 201 may indicate a geo-register of where vegetation is on the ground via latitude and longitude coordinates, for example.

In one or more embodiments, the vegetation management module 202 may provide for the fusion of data from multiple sources to provide an accurate status of vegetation and assist an operator in making informed decisions. As used herein, the terms "user" and "operator" may be used interchangeably. One or more embodiments may provide for satellite/aerial image analysis of vegetation, via the vegetation management module 202, by fusing information from medium, high and ultra-high resolution data. Medium and high-resolution data may be satellite and aerial imagery data that is freely available (e.g., sentinel satellite data and National Agriculture Imagery Program (NAIP) imagery, respectively) and whose ground sampling distance (GSD) is greater than or equal to 60 cm. As used herein, ultra-high resolution satellite data may refer to commercial satellite data with a GSD of less than 60 cm. It is noted that the different categories of medium, high, and ultra may point to different resolutions of data coming from different sources at different resolutions. It is further noted that the classification of medium, high and ultra may or may not be strictly based on sampling distance. The fusion of analytics on multi-modal data may improve the trim cycle of the transmission and distribution providers by providing accurate analytical data to allow the providers to plan in advance and distribute resources based on need. As a non-exhaustive example, the vegetation information obtained from satellite data may help provide accurate work orders for the vegetation service companies. This information may also enable more bidders to bid for the work contract.

The vegetation management module 202 may also receive, in S112, GIS image data 208 for the feeders 302 (FIG. 3) from the utility company 210 or other suitable source. The vegetation management module 202 may then overlay the image data 201 for a given area of interest with the GIS data 208 (or vice versa) in S114 to generate an overlaid image 212 (FIG. 3). The overlaid image 212 may show the path of the feeders 302 through the vegetation. As described above, there may be well-defined trimming procedures for each feeder (e.g., the distance/amount of vegetation to be trimmed, the type of trimming generally, and the type of trimming based on the species of trees, etc.). As a non-exhaustive example, each feeder 302 may have a buffer zone 304 (also shown in FIG. 9) around it, where the buffer zone 304 is the area around the feeder 302 that needs to be clear of vegetation. For example, the buffer zone 304 may be about five to ten feet on either side of a feeder 302. Other suitable buffer zones may be used. The buffer zone 304 may be determined by the utility company or any other suitable party.

Conventionally, a technician walks the length of a feeder and the width of the buffer zone 304 and physically measures the encroachment of the vegetation on the buffer zone 304. This is a very manual and time-consuming process that may also be subject to error as there may be poor visibility of the state of vegetation from the ground. However, the nature of the fixed trimming schedule is that no knowledge of the status of the actual vegetation is needed, making for an inefficient process.

In one or more embodiments, the vegetation management module 202 may determine in S116, based on the overlaid image 212 and buffer zone 304, whether vegetation is present. In a case that the vegetation management module 202 determines in S116 that vegetation is not present, the process ends at S118. As a non-exhaustive example, the vegetation management module 302 may use a vegetation mask 324 to determine, for example, the probability that a certain area of an image includes vegetation or another categorized object, as described in co-pending U.S. patent application Ser. No. XXXXX, entitled "SYSTEM AND METHOD FOR VEGETATION MODELING USING SATELLITE IMAGERY AND/OR AERIAL IMAGERY." Other suitable processes of determining wither vegetation is present or not present may be used. In a case that the vegetation management module 202 determines in S116 that the vegetation is present, the process 100 proceeds to S120 to determine whether the amount of vegetation exceeds a vegetation threshold value 214 as encroaching on the buffer zone 304. The vegetation management module 202 may use an appropriate Key Performance Indicator (KPI) to analyze an area that's occupied by vegetation in the buffer zone 304 to determine whether the vegetation management module 202 will determine a risk score 206. A non-exhaustive list of KPIs include the length of the encroachment, area or volume of encroachment. In some embodiments, the vegetation management module 202 may analyze the KPI with respect to an entire feeder 302 or may analyze one or more segments 306 of the feeder 302. As described above, any portion of the feeder 302 between two poles may be a feeder segment 306. It is noted that whether the analysis is for the entire feeder or for one or more segments may be task specific. For example, when a vegetation inspector is looking for spot trimming, they may consider the segment, but if the inspector is planning for scheduled conventional trimming, they may consider the entire feeder as the contract for trimming.

In a case that the vegetation management module 202 determines in S120 that the vegetation does not encroach the buffer zone 304 beyond the vegetation threshold value 214, the process 100 proceeds to S118 and the process 100 ends. In a case that the vegetation management module 202 determines in S120 that the vegetation does encroach the buffer zone 304 beyond the threshold value 214, the process 100 proceeds to S122.

In S122, for the feeder 302 (or feeder segment 306), the vegetation management module 202 may receive feeder attribute data 216 related to the feeder 302 for different time instants. The following will be described for an entire feeder 302, but may be applicable to a feeder segment 306. The feeder attribute data 216 may include, but is not limited to, at least one of: environmental data 218, reliability data 220 and operational data 222. Environmental data 218 may include, but is not limited to, historical and forecasted weather data (e.g., extreme wind conditions, wind direction, wind speed, wind pressure, wind gust, precipitation, snow, rain, temperature, etc.) from a weather source, vegetation density and soil conditions. Reliability data 220 may include but is not limited to, customers impacted/affected (CI) in that given area of interest (AOI) 308, number of historical utility outages due to vegetation-related incidences, Customer Average Interruption Duration Index (CAIDI), System Average Interruption Duration Index (SAIDI) and System Average Interruption Frequency Index (SAIFI). Operational data 222 may include, but is not limited to, last trimming date and next trimming date data, the number of customers and overhead coverage of the feeder length of feeder. The feeder attribute data 216 may be received from a computer data store 250, utility database 224, cloud storage, and any other suitable source.

Then in S124, the vegetation management module 202 may determine a risk score 206 based on the overlaid image 212 showing the location of the feeders and vegetation related thereto data and the feeder attribute data 216. In one or more embodiments, the vegetation management module 202 may estimate a stage of a feeder 302, and then determine the likelihood the feeder 302 will suffer an outage soon (e.g., from a fault, a tree will hit it, etc.) based on the estimated stage. The risk score 206 is a measure of impact of the power/utility outage, which is computed based on multiple attributes discussed previously (ex. Customer impacted, number of outages, etc.).

As a non-exhaustive example, there may be a first area where there are a few customers, but historically the wind is high and there are a lot of trees. This first area may have a high risk score. There may also be a second area including a feeder 302 that is very long and supplies a lot of houses, but there is only one tree in the buffer zone 304 for the feeder 302. The second area may also be considered high risk because it is more impactful than risk of losing utility in the first area. In one or more embodiments, the vegetation management module 202 may input the overlaid image data 212 and the feeder attribute data 216 to a risk model 226 trained via the machine learning module 204 to review the historical outage patterns, to output a prediction of where and when the outages may be in the future, as well as the impact of those outages. The vegetation management module 202 may then use this prediction to generate a trimming schedule 228.

In one or more embodiments, the risk score 206 may be determined for two main reasons. The first reason is that within a year, there is a given subset of feeders 302 that has vegetation in their buffer zone and is ready for a trim per the four-year trimming schedule. In order to mitigate grid outages due to increased vegetation, vegetation along feeders (or segments of feeders) may as a default be trimmed in a four-year cycle. While the examples herein are described with respect to a four-year cycle, cycles of different durations may be used. The risk score 206 may allow the vegetation management module 202 to prioritize an order in which to trim feeders/trees within that given subset. For example, if the feeder attributes 216 indicate that both the number of customers affected and the vegetation density are high, a feeder 302 may receive the highest risk score; then slightly lower scores as either the number of customers affected or the vegetation density decrease. The second reason for determining the risk score 206 is for unscheduled trimming, which may also be referred to as "hot spot" trimming. Hot spot trimming occurs for high-risk feeders before the four-year trimming schedule. For example, if it has been less than four years since Feeder A has been trimmed, Feeder A may still be trimmed because the vegetation management module 202 determines a high risk score for Feeder A (e.g., if there was an outage for Feeder A, it would have a big impact).

Customer Impacted (CI) feeder attribute 216 is used to determine the risk of feeders. Conventionally, the utility company follows a scheduled four-year trimming schedule and hot spot trimming. Conventionally, the utility company has a "fixed tree trimming schedule," where they trim a particular feeder once every four years. As described above, a four-year schedule is something the utility companies decide for themselves and may be changed. With conventional "hot-spot trimming," when a customer complains of tree branches encroaching electrical lines or there's an area where a lot of outages have happened in the past, utility companies will send a tree trimming crew to just chop all branches in that feeder/feeder sections. Conventional hot-spot trimming is not scheduled, and instead performed on a need basis. It is noted that a benefit of determining the risk score 206, as described by one or more embodiments, may be a reduction in the number of outages, thereby improving reliability of the grid. This reduction may be based on a prioritization of the trimming of particular feeders. As described above, in one or more embodiments, the vegetation management module 202 may use the risk model 226 to generate the risk score 206. The risk model 226 may be a multi-variate model that may predict the risk of an outage for each feeder. The risk model 226 may ingest various reliability 220, environmental 218 and operational 222 attributes to compute the risk score 206 which quantifies the likelihood of a feeder 302 having an outage over the next temporal horizon (e.g., a month, a year, or other suitable time frame). One or more embodiments may also provide to the operator, as described further below, the feeder attribute data 216 which is the major contributor to the risk score 206.

It is noted that while three modeling approaches (regression, classification and survival modeling) to generate the risk model 226 are provided herein, other suitable modeling approaches may be used.

With a regression approach, any of the suitable reliability metrics is modeled as a function of the feeder attribute data 216. The choice of the metric is governed by the operator objectives. A non-exhaustive example of how a risk score may be computed using a regression approach is the use of CAIDI. For example, $$CAIDI_t = f_\beta(\text{Reliability}_{t-1}, \text{Environmental}_{t-1}, \text{Operational}_{t-1}).$$

In this CAIDI case, the user indicates that CAIDI is the most suitable measure. The model is then trained using CAIDI as the predicted variables, and other attributes as the input variables. During the evaluation phase, the output produced by the trained model is the risk.

With the classification approach, a suitable threshold on one/many reliability (which is derived based on user objectives) may be used, and during training, the feeders may be divided into "high risk" and "low risk" feeders. Then a classification model may be formulated as follows, $$\text{risk}_t = g_\alpha(\text{Reliability}_{t-1}, \text{Environmental}_{t-1}, \text{Operational}_{t-1})$$

During the evaluation phase of the classification approach, the output produced by the trained model is the risk score.

In the above, $f_\beta$ is a regression model with parameter $\beta$, and $g_\alpha$ is a classification model with parameter $\alpha$. Standard machine learning methods like linear regression, neural networks or logistic regression can be used to determine the function as well as the unknown parameters.

With the survival modeling approach, the model may analyze or predict when an event is likely to happen. In this approach, a survival time T is defined as the waiting time until an 'event' occurs and a hazard function is defined as $$h(t) = \frac{dS(t)}{dt}$$

where S(t) is the probability that an 'occurs' after time t.

A parameterized model $h_\gamma$ is used to model the hazard function $$h(t) = h_\gamma(\text{Reliability}_{t-1}, \text{Environmental}_{t-1}, \text{Operational}_{t-1})$$

Historical data is used to learn an estimate of $h_\gamma$. The hazard estimates may be used to compute the risk in a suitable manner, where h(t) is the risk score 206 for a given time, t.

The inventors note that while regression and classification methods may be used, the survival modeling for implementing the risk computation may better explain the underlying physics.

In one or more embodiments, the risk score 206 output from the risk model 226 may be used to at least one of: sort, evaluate and highlight risk levels for given feeders. The contributions of each feeder attribute data 216 to the risk score 206 may be analyzed to highlight the risk factors associated with each feeder 302. The risk score 206 output from the risk model 226 may also be used to generate a trimming schedule 228. For example, combining the risk score 206 and a spatial proximity of feeders to each other, may provide a trimming schedule 228 with an optimal order for which feeders 302 to trim in the beginning of the year and which feeders to trim in the later part of the year. The risk score 206 output from the risk model 226 may also be used to prioritize feeders for unscheduled trimming (hot spot trimming) in a trimming schedule 228. For example, the higher the risk score 206, the higher the benefit of unscheduled trimming. It is noted that hotspot trimming may be more beneficial when there is a constraint on the number of trees which may be trimmed.

It is noted that in one or more embodiments, the parameters of the risk model 226 may be tuned to account for different attributes. For example, different training data may be used to alter what the model predicts to be "high risk". As described above, risk is measure of impact of an outage, and a utility may determine what factors make an outage high risk. Then the survival model described by one or more embodiments may model that behavior.

Turning back to the process 100, after the vegetation management module 202 may determine a risk score 206 in S124, the vegetation management module 202 may execute a clustering model 230 in S126 to generate one or more geospatial clusters 232 to group feeders 302 within close proximities to each other which also share similar risk scores. The geospatial clusters 232 may be used to prioritize the trimming in the trimming schedule 228 based on the predicted risk score 206 as well as the geographical locations of the feeders 302.

Conventionally, an operator (e.g., vegetation inspector) creates a trim schedule manually at a substation level to save the travel and equipment cost for trimming. As used herein, a "substation" refers to electrical generation, transmission, and distribution system where multiple feeders originate. This conventional trim schedule based at substation level may be sub-optimal because the substation may contain many low risk feeders that may be trimmed unnecessarily, when high risk feeders in other substations within the same geographical locations may be trimmed instead. Consider the following scenario: conventionally if a vegetation inspector (operator) is going to send their trimming crew hundreds of miles away to trim vegetation in area A that has met the four-year schedule, for example, they may have the trimming crew also trim every feeder that belongs to that sub-station en route to area A. This is not economical in the sense that feeders are going to get trimmed that are not risky or are not in need of trimming, while other areas include riskier feeders and are not going to be trimmed.

Embodiments resolve this scheduling inefficiency by combining the feeder-level risk scores 206 along with geographical proximity to determine geospatial clusters 232 and then these geospatial clusters 232 may be used to determine which set of feeders across different regions should get priority trimming over the others. For example, the trim schedule may be in a descending order of risk so that the highest risk clusters may be scheduled for trimming first. It is noted that in some embodiments the clustering may move the trim schedules away from the conventional plan of trimming feeders based on sub-station, and instead may move the trim schedule towards grouping based on the combination of a feeder's location (latitude and longitude) on the map and a risk associated with that feeder.

In one or more embodiments, the vegetation management module 202 executes a clustering model 230 to group feeders 302 within close proximities to each other which also share similar risk scores 206. The clustering model 230 may receive the given geographical location for each feeder, as well as the associated risk score 206 for each feeder as input. In one or more embodiments, the feeders 302 input to the clustering model 230 may be within a user-defined area. It is noted that while the input to the clustering model 230 is described herein as geographical location and risk score for a feeder, the clustering model 230 may also receive as input other feeder attributes including, but not limited to, feeder length, vegetation density, and as described further below—amount of feeder overlaps (i.e., the amount a buffer zone for a first feeder overlaps a buffer zone of a second feeder), etc. The clustering model 230 may apply any suitable clustering approach, including, but not limited to, k-means, hierarchical, manifold, graph-or learning-based approaches to generate the geospatial cluster 232.

The clustering model 230 may also include in a geospatial cluster 232, feeders 302r based on feeder overlap 402 (FIG. 4), as mentioned above. In one or more embodiments, the vegetation management module 202 may determine whether two or more feeders overlap. In a case that a buffer zone of a first feeder overlaps a buffer zone of a second feeder by some operator determined amount in terms of location and amount (width and/or length), the feeders associated with those buffer zones are considered to be "overlapping." The overlap 402 may be with respect to the whole feeder 302 or feeder segments 306. Conventional trimming schedules prepared at a feeder/substation level may not take into account the existence of overlap of feeders. As such, conventionally, when a vegetation trimming crew goes to trim vegetation for a feeder, they may end up going to the same location multiple times because the trimming assignment is for a whole length of an individual feeder, not taking any overlap of additional feeders into consideration, resulting in a lot of inefficiencies in time and financial resources. To resolve this problem, the vegetation management module 202, in one or more embodiments, uses the GIS data 208 of the asset to calculate the feeder segments 306 where the overlap occurs. For example, as shown in the map 400 in FIG. 4, the analysis may be displayed in a visualization, as described further below. The map 400 shows thicker segments, which indicate the overlap 402 of two or more feeders. At least one of the two overlapped feeders is due for trimming in 2020 based on a four-year trim schedule, but was already trimmed with the other one of the overlapped feeders based on the overlap analysis. It is noted that the visualization/map 400 may also display feeder attributes including, but not limited to, overlapping segments, names of overlapping feeders (not shown), length of the overlap (not shown) and overall overlap percentage, so that the operator may interact with the data and make informed decisions for trim scheduling. For example, while the clustering model 230 may include overlapping feeders in the cluster, the operator may review these other attributes for the overlapped feeders and decide not to trim the two overlapping segments at the same time.

These overlapping feeders may then be incorporated into a given cluster 232 so that the operator notes that the vegetation crew may trim the vegetation for the overlapping two or more feeders at the same time. This may avoid multiple unnecessary visits to the feeders where overlaps are present. This may provide for efficient management of time and resources. As used herein, clustering may be the process of grouping two or more feeders into a cluster, as these feeders should be trimmed together. If there is a given amount of overlap between two or more feeders, it may be more efficient if these feeders are trimmed at a same time.

It is noted that one or more conditions of the clustering model 230 may be manipulated to accommodate operator objectives. For example, the operator may have different trim budgets and may need to alter a clustering model parameter for the amount of trimming that can be done, or the operator may have different miles of feeder to analyze, and may need to alter a feeder length model parameter. The operator may need to introduce a new model parameter or remove an existing model parameter to account for an operator objective. In one or more embodiments, a weight may be assigned to each feeder during the execution of the clustering model 230 (or after execution of the clustering model) to satisfy the model parameters and objectives. For example, if the operator wants to emphasize longer feeders with high risk, the operator has the flexibility to increase or decrease the number of clusters and feeders within those clusters. The operator may also manipulate the ranking of feeders within a given cluster, or move them to other clusters, for better efficiency.

Figure 5A:
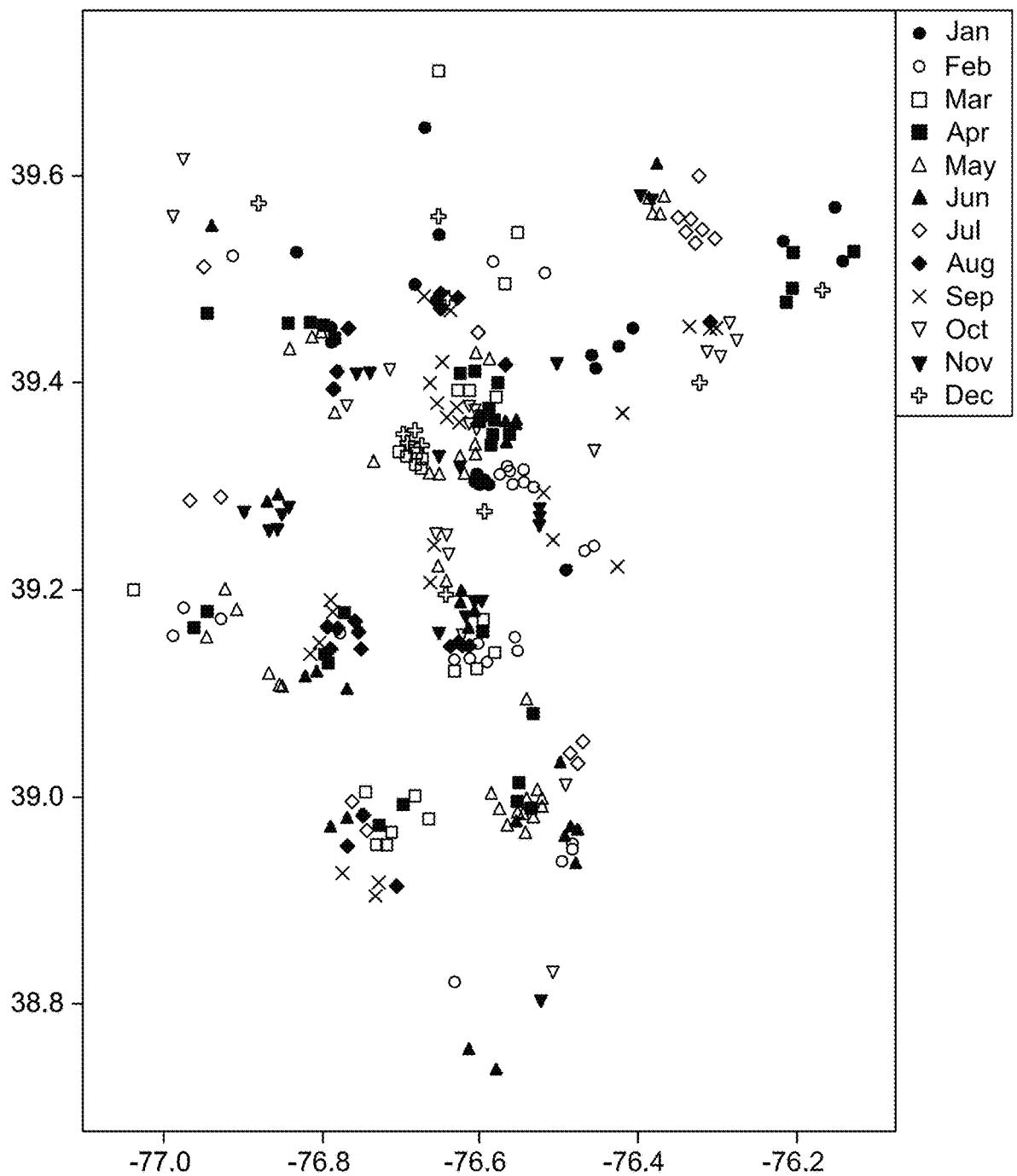
FIG. 5A illustrates a non-exhaustive example of a graph.
Figure 5B:
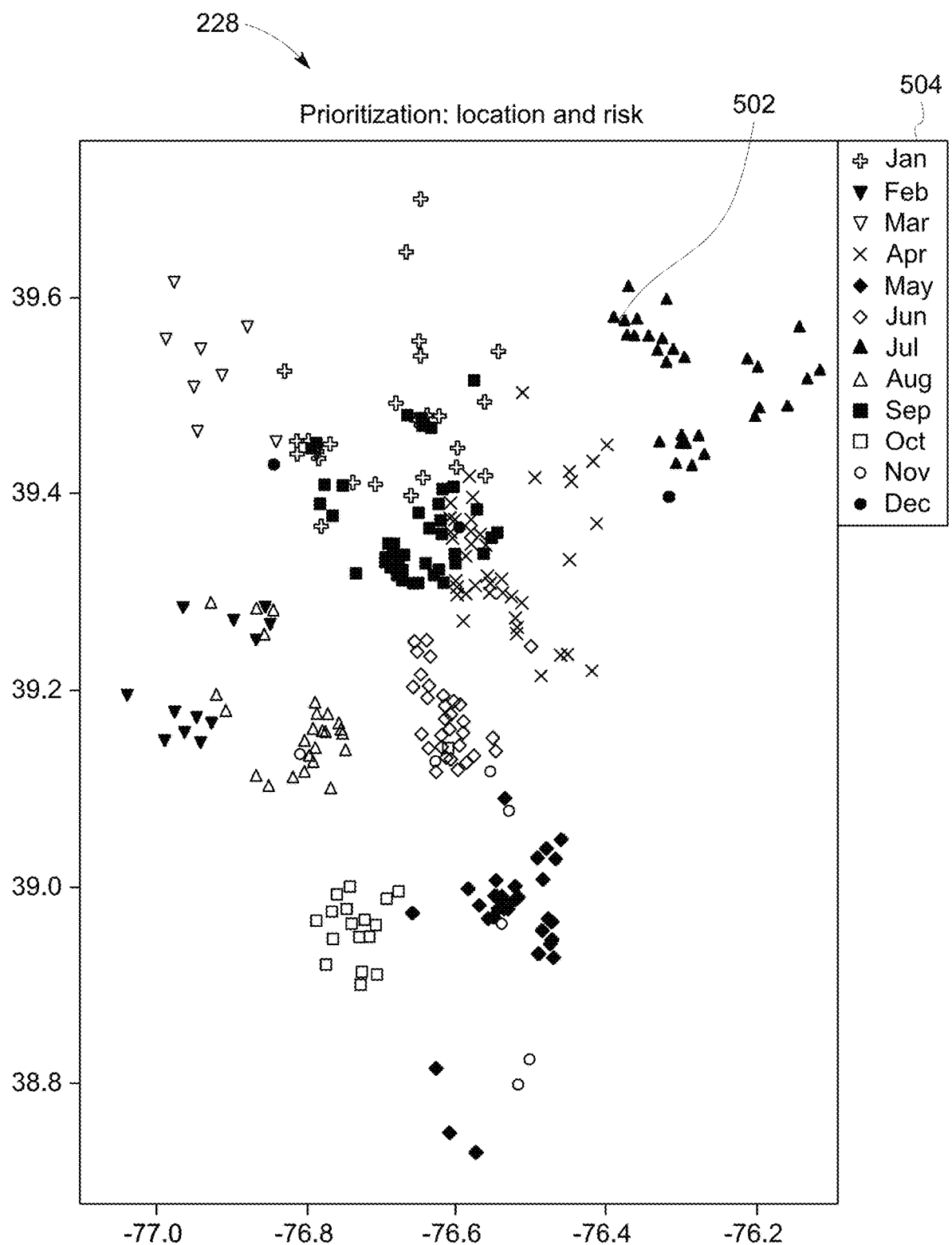
FIG. 5B illustrates a non-exhaustive example of a graph according to some embodiments.

FIGS. 5A and 5B show trim schedules 228, where each shape 502 represents a mid-line of a feeder, and the different shapes/shadings represent the scheduled month for trimming the feeder per the key 504. FIG. 5A shows a conventional trim schedule based on sub-station, and based on the four-year trim schedule. As can be seen from the different shapes/shadings, for any given month, there are a plurality of feeders to be trimmed in different areas. FIG. 5B shows a trim schedule based on risk and geospatial clustering described by one or more embodiments. As shown in FIG. 5B, the feeders (whose midlines are indicated by shapes) are clustered so that in a particular month, the feeders in one area are scheduled for trimming, and in another month, the feeders in another area are scheduled for trimming. As described above, with the scheduling based on risk scores and/or clustering, if the operator is in December and looking to create a trim schedule 228 for the following year, embodiments may generate a trim schedule 228 such that the feeders/clusters with the highest risk score are scheduled to be trimmed more immediately (e.g., in January), and the feeders/clusters with the lowest risk scores may be scheduled to be trimmed in November.

Turning back to the process, in S128, a visualization module 234 of the vegetation management module 202 generates a visualization 301 (FIG. 3) and displays the visualization 301 on a user interface (UI) 300. In one or more embodiments, the UI 300 may be a user friendly dashboard which improves decision making by providing an operator with interactive maps including feeders and feeder-related information in the visualization, as well as reactive risk assessment tables, control parameters for filtering, right of way information, "road improvement" work, grid overlap and other necessary information needed by operators to make decisions. The map may use technology that allows superimposition of real time satellite imagery to inspect the current state of vegetation once data is pulled from a given satellite at an appropriate resolution.

In one or more embodiments, the visualization module 234 may present a visualization 302 that is an interactive, intuitive way to present the output of the vegetation module 202 (e.g., risk scores based on a certain model), as well as feeder attribute data 216 (e.g., year the trim was completed, density, survival). The operator may use the visualization 301 to interpret the results of the vegetation module 202 and make a decision regarding a trimming schedule 228 and prioritizing feeders to be trimmed. The visualization 301 may visually explain to the operator the causality of the risk scores 206. The causality may either confirm or reject a given risk score and thus help in decision making and scheduling. Once the decision is made, publishing capabilities of the vegetation management module 202 may allow the trimming schedules 228 to be sent out to trim teams and/or other systems, so that the trimming may be executed in an optimized devised manner.

Figure 6:
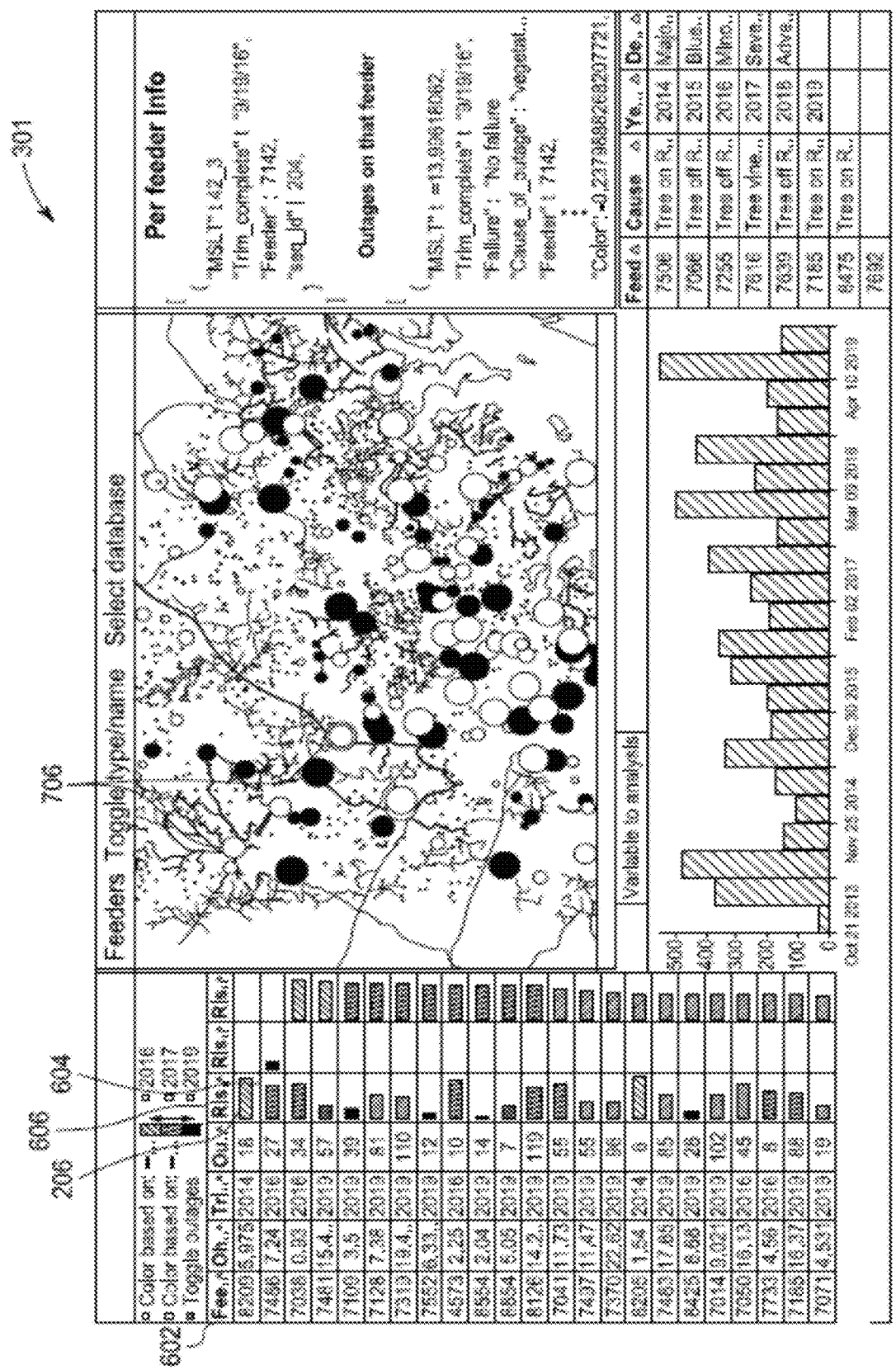
FIG. 6 illustrates a non-exhaustive example of a user interface according to some embodiments.

Turning to FIG. 6, for example, the visualization 301 may include a table 602 and risk scores 206 in a risk score column 606. The table 602 may be sortable. The risk scores 206 may be shown as a heat map bar 604 inside each cell in the table 602. As shown herein, small scores are short bars 604 and high scores are long bars 604. As a non-exhaustive example, the first row in the table has a long bar which represents higher risk, while the fourth row in the table has a short bar which tells us that feeder has lower risk. It is noted that the heat map may assign suitable visual characteristics to different values (e.g., color, pattern, hatching, etc.). Each risk score 206 is a number between 0 and 1, where 0 corresponds to the short heat map bar and 1 corresponds to the long heat map bar. A score of 1 fills the cell with a horizontal bar. A low score, of 0.1 for example, fills 10% of the cell and, since it's a heat map, the cell is a different color than that of a long heat map bar. The interpolations are linear for a score "s". The visualization 301 shown in FIG. 6, allows a user to quickly spot high risk scores in the table, without having to read values. Also, when sorting the risk scores 206 in the risk score column 606, it may be easy to scroll down to the place where the bars change color. In addition to the actual risk score 206, the table 602 may include information pertaining to the risk score including but not limited to: feeder associated with the risk score, length of the feeder, when was the feeder last trimmed, the number of outages on that feeder, etc. In some embodiments, when the table 602 is sorted on a particular risk score 206, the feeders with a high risk score may be pushed to the top of the table. If a given feeder has all three scores red (i.e., high), it is plausible visually that the feeder needs to be scheduled sooner rather than later. It is noted that in one or more embodiments, multiple risk scores may be defined based on how you combine those attributes and the use case. As a non-exhaustive example, consider two other risk scores: risk outage score and risk density. "Risk outage score" is a linear combination of two factors: outage and time since last trim. Risk density is a combination of vegetation density, outages, overhead miles and customer impacted. The user may view different risk metrics so he can choose what's most appropriate for his task.

Figure 7:
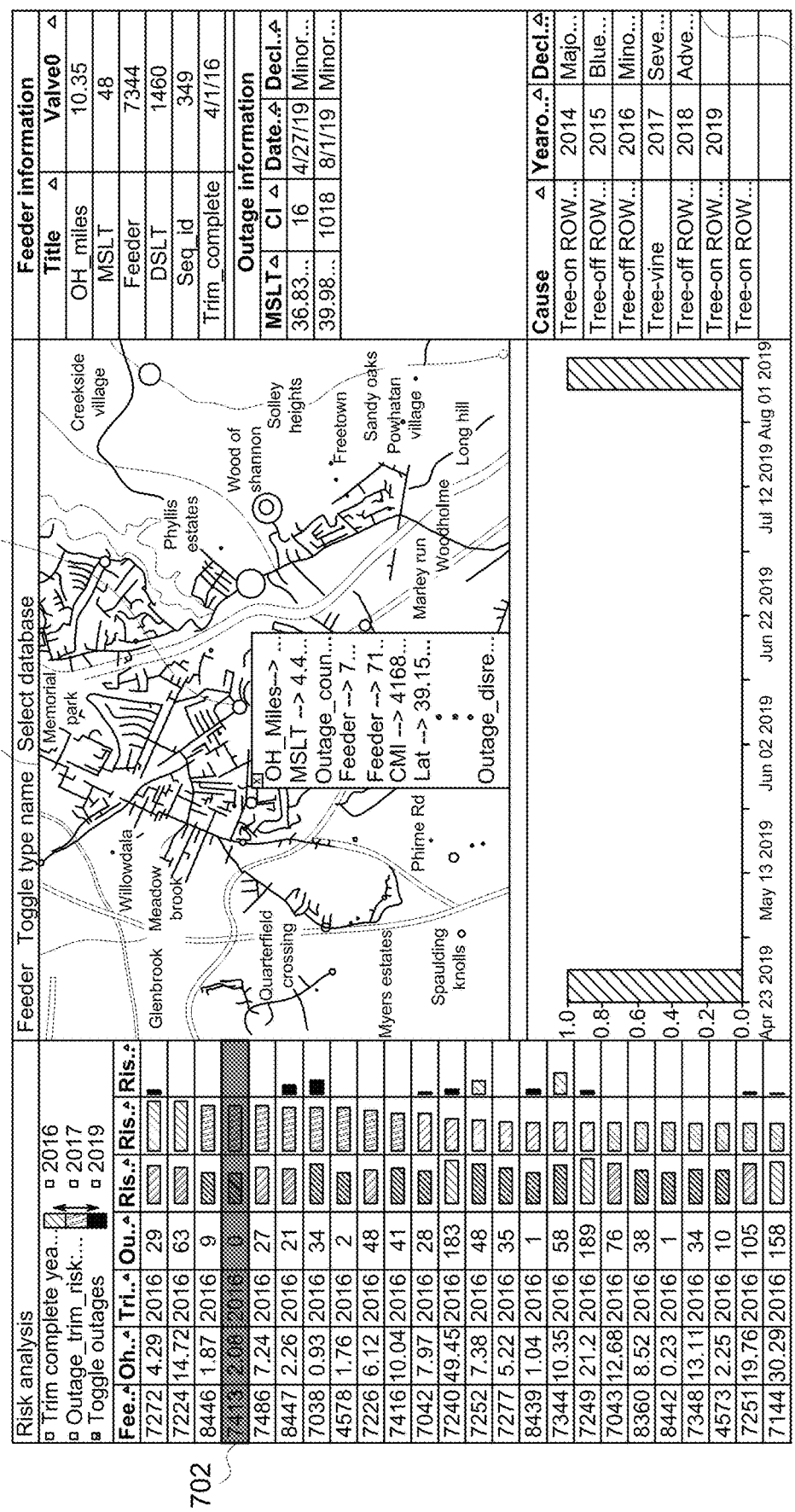
FIG. 7 illustrates a non-exhaustive example of a user interface according to some embodiments.

In one or more embodiments, after the operator interacts with the table 602 and selects a particular feeder via any suitable selection method, the operator may further interact with the visualization 301, to drill down in that particular feeder 302 to view data related to the risks and generated risk score. For example, as shown in FIG. 7, when the operator selects a feeder number in the table 602, the line that the operator selected becomes highlighted 702 to indicate the selection. The map 704 may then automatically navigate to the feeder 302 in the highlighted selection 702. The color (or other visual indicator) of the feeder lines on the map may reflect the heatmap value of the risk score of the selected feeder. The map 704 may also include dots 706 on the feeder. Each dot 706 may correspond to a historical outage that occurred on that feeder. The size of the dot 706 may be proportional to the number of customers affected, and the color (or other visual indicator) of the dot 706 may represent the CHI (Customer Hours of Interruption). This visual display of the feeder attributes for a given feeder may add visual insights for the operator. For example, in a case that the feeder is full of big red dots, this may indicate that the feeder is susceptible to outages that affect many customers for long periods of time.

In one or more embodiments, the operator may select any dot 706 on the map to view additional information about the outage. The additional outage data 708 may include, but is not limited to: cause of outage, customer Interrupted; date of outage; date of last trim; outage duration, CMI, etc.

The visualization in FIG. 7 may also show, below the map, a histogram 710. The histogram may show statistics and trends about the feeder. The histogram 710 may also be interactive. As a non-exhaustive example, the operator may pull different variables (e.g., CI, CMI, Outage count, verses time) on the X axis, to see time patterns such as seasonal effects, trimming effects, and other effects that project or repeat in the future (i.e. seasons). Visual interpolation of the trends for the selected feeder may confirm or oppose visually a certain score or set of scores output by the vegetation management module 202.

The visualization module 234 may also include a front end module 236 and a back end module 238. The front end module 236 may be built on a React-Redux process 240, which may in turn use d3 (data driven documents) to visualize the data served by the back end module 238 per the one or more data sources. In one or more embodiments, the React-Redux process 240 may enable reusable visualization components to display information on maps as an operator is interacting with the data. The React component may be used as a wrapper to d3, using javaScript asynchronous functional programming that provides real time responsiveness of the interactive visualization features described further below. The React component may provide re-usable d3 components. The Redux component may create a common data store, that may allow the synchronization of multiple React features. While the front end module 236 is described herein with respect to the React-Redux process 240, this is a non-exhaustive example, and any other suitable process may be used to build the front end module 236.

In one or more embodiments, the backend module 238 serving the data for the visualization 301 (map, graph, table) may be written in Python (or any other suitable programming language) and may connect to different types of database/data sources (e.g., weather, vegetation, satellite, assets, etc.). In one or more embodiments, the backend module 238 may use sockets and REST calls to accurately provide the transfer of big quantities of data, as well as real time responsiveness of the sockets between processes and processors.

As a non-exhaustive example, one of the elements of the React component wraps around a MapGL element, which may provide for the use of an acceleration graphics card of a user-device providing the UI. The MapGL element may provide for embedding customizable and responsive client-side maps in web, mobile and desktop applications. The React component may wrap around the MapGL element and may send the GPS coordinates, orientation and position of the virtual 3D eye to the backend module 238. This information may be transmitted to the backend module 238 as a translation vector and a rotation matrix, and may be transmitted using sockets for real-time responses. The transmitted information may then be processed by the backend module 238, which may determine what part of the data to obtain from the database(s)/data sources, to then send to a map renderer (e.g., a 3D MapGL renderer) inside the React component on the front end module 236. One or more embodiments may synchronize MapGL data requests to the GPS position of a virtual eye. The role of the Redux component, in one or more embodiments, may be to synchronize the data on a map (e.g., maps shown in FIGS. 3, 6-9 and 11) with the different parameters, shown in the corresponding tables and graphs, as described further below.

Figure 8:
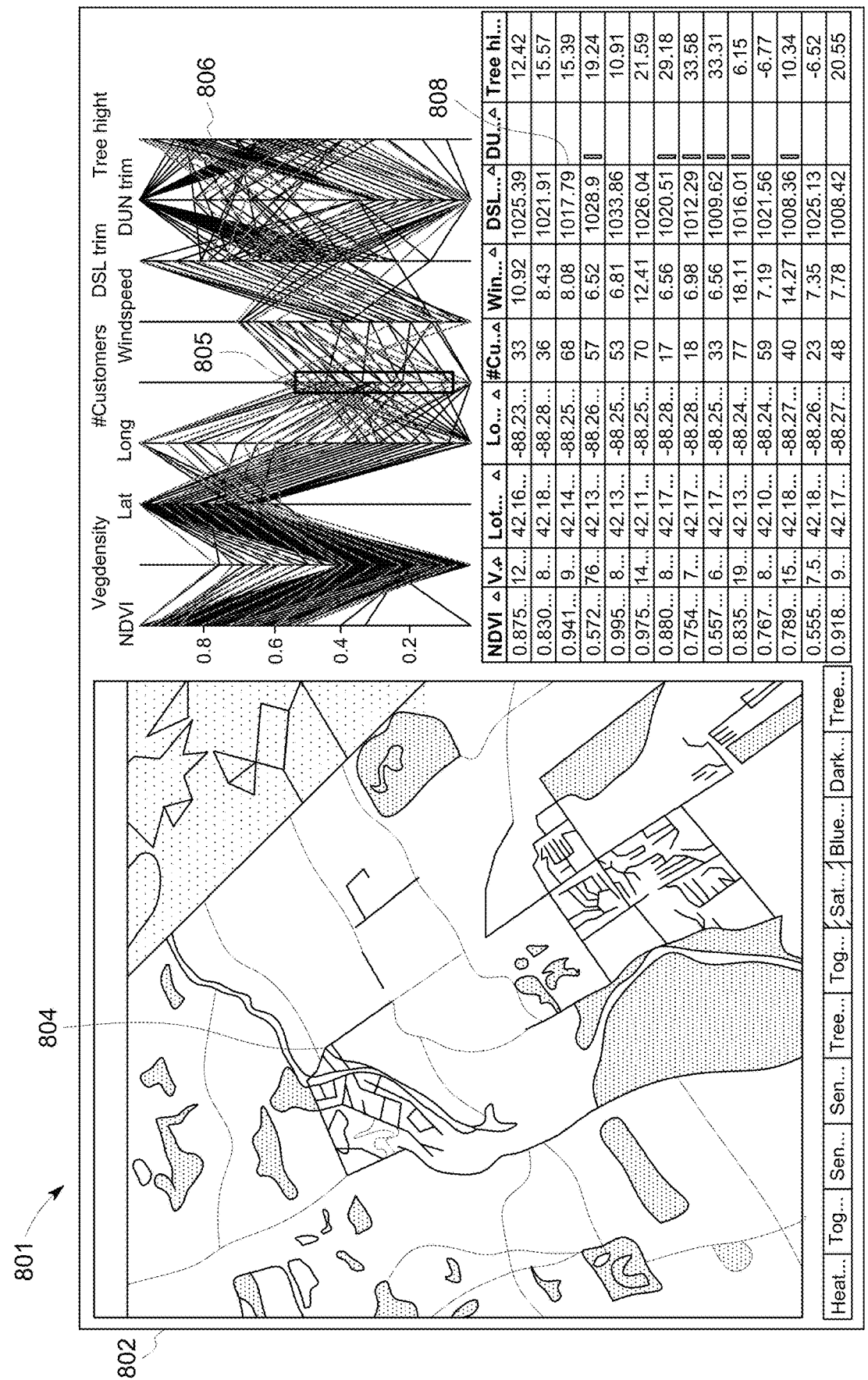
FIG. 8 illustrates a non-exhaustive example of a user interface according to some embodiments.
Figure 9:
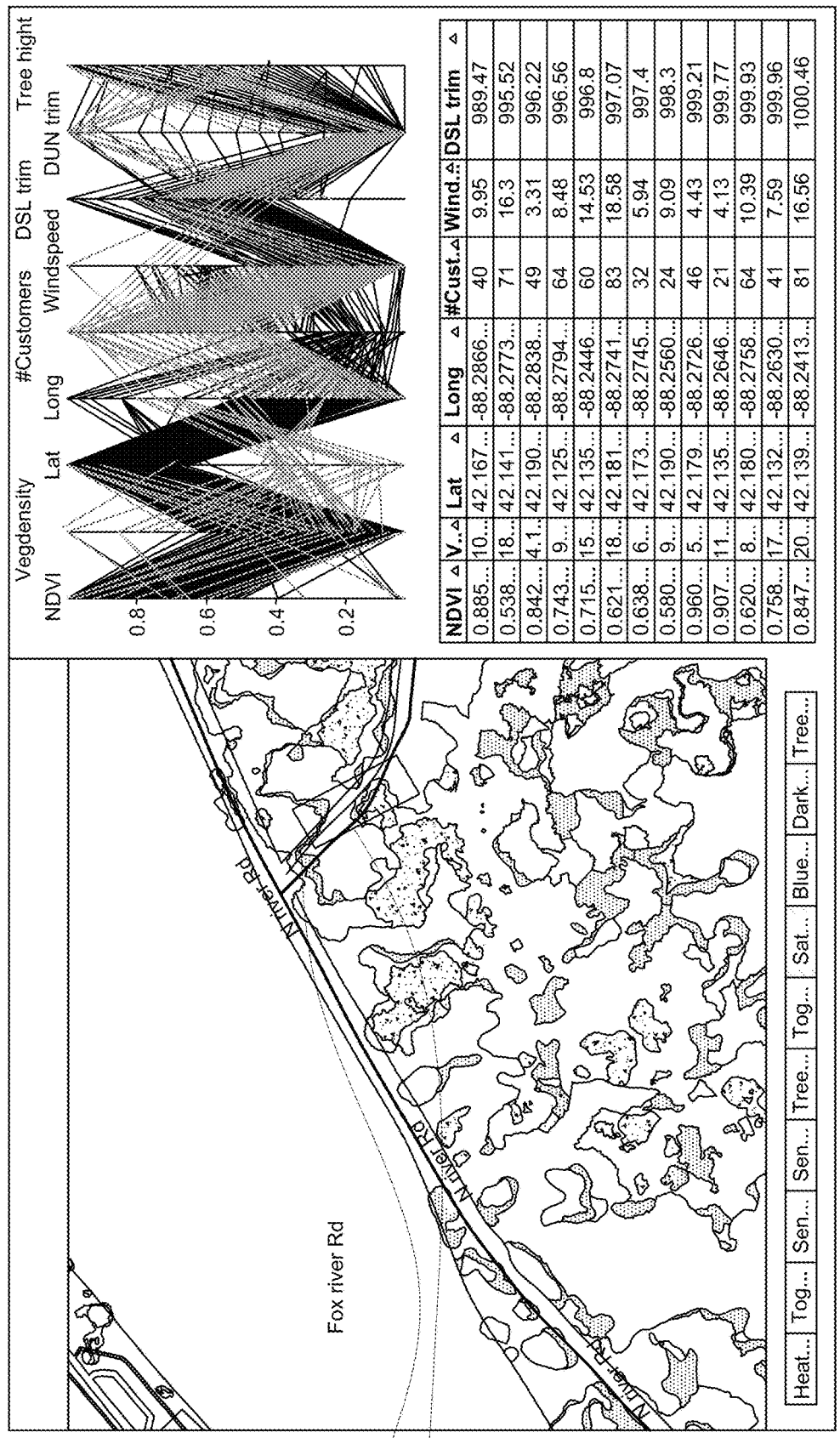
FIG. 9 illustrates a non-exhaustive example of a user interface according to some embodiments.
Figure 10A:
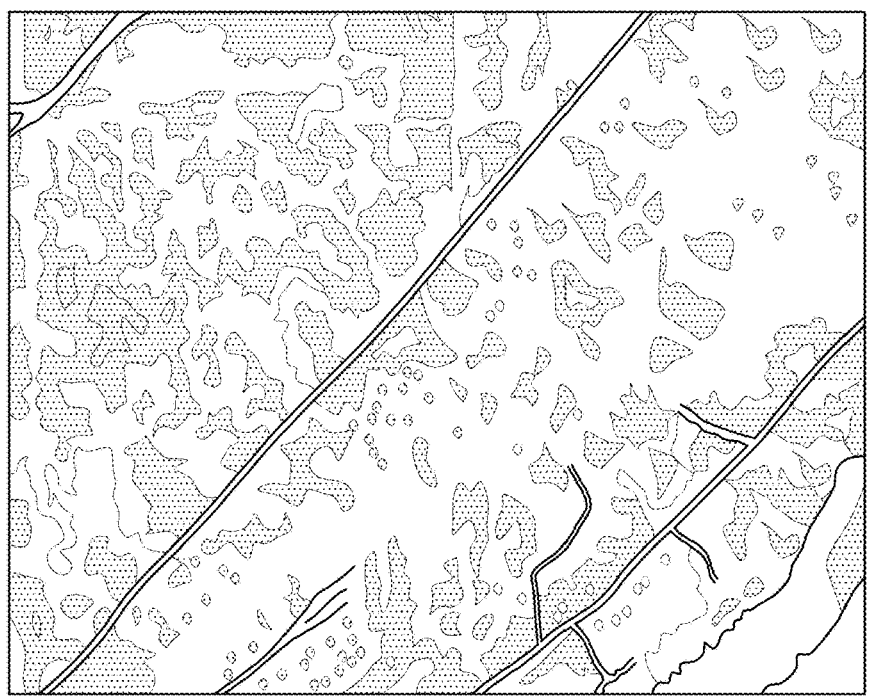
FIGS. 10A-10D illustrate non-exhaustive examples of user interfaces according to some embodiments.
Figure 10B:
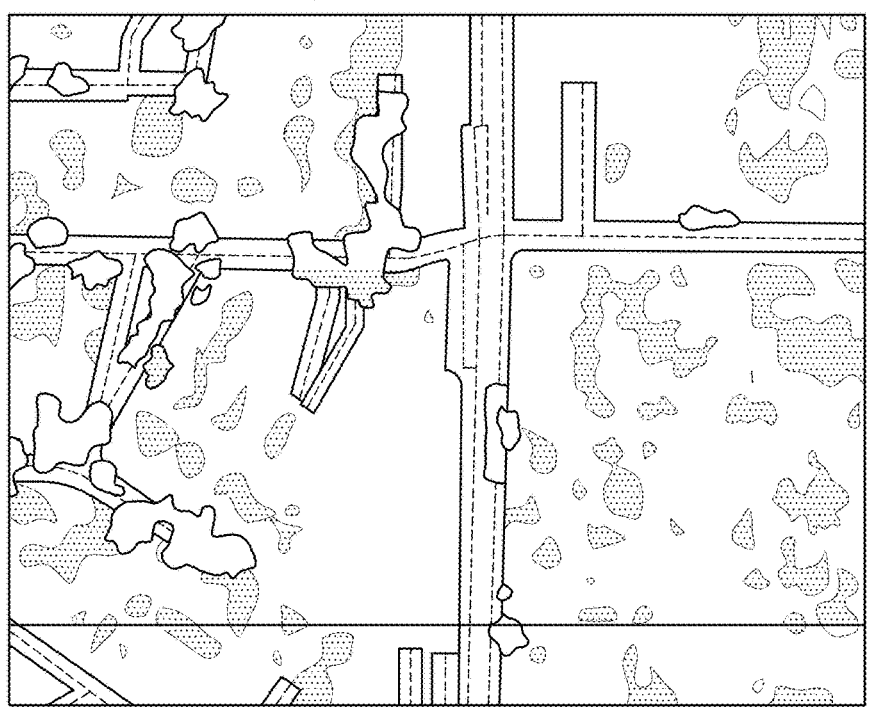
Figure 10D:
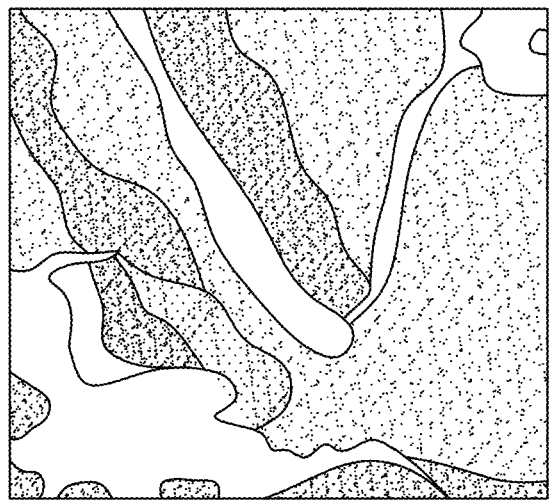
Figure 10C:
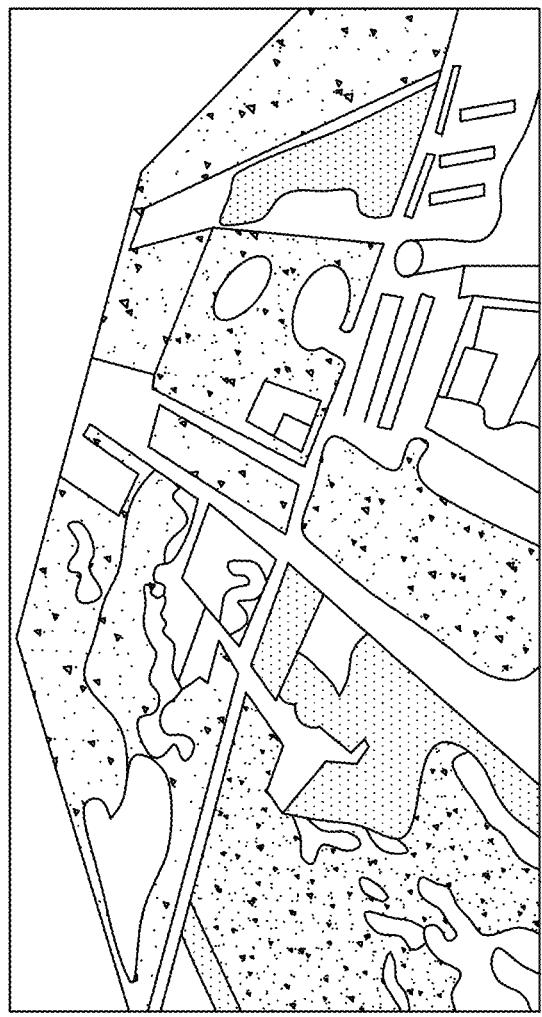
Figure 11:
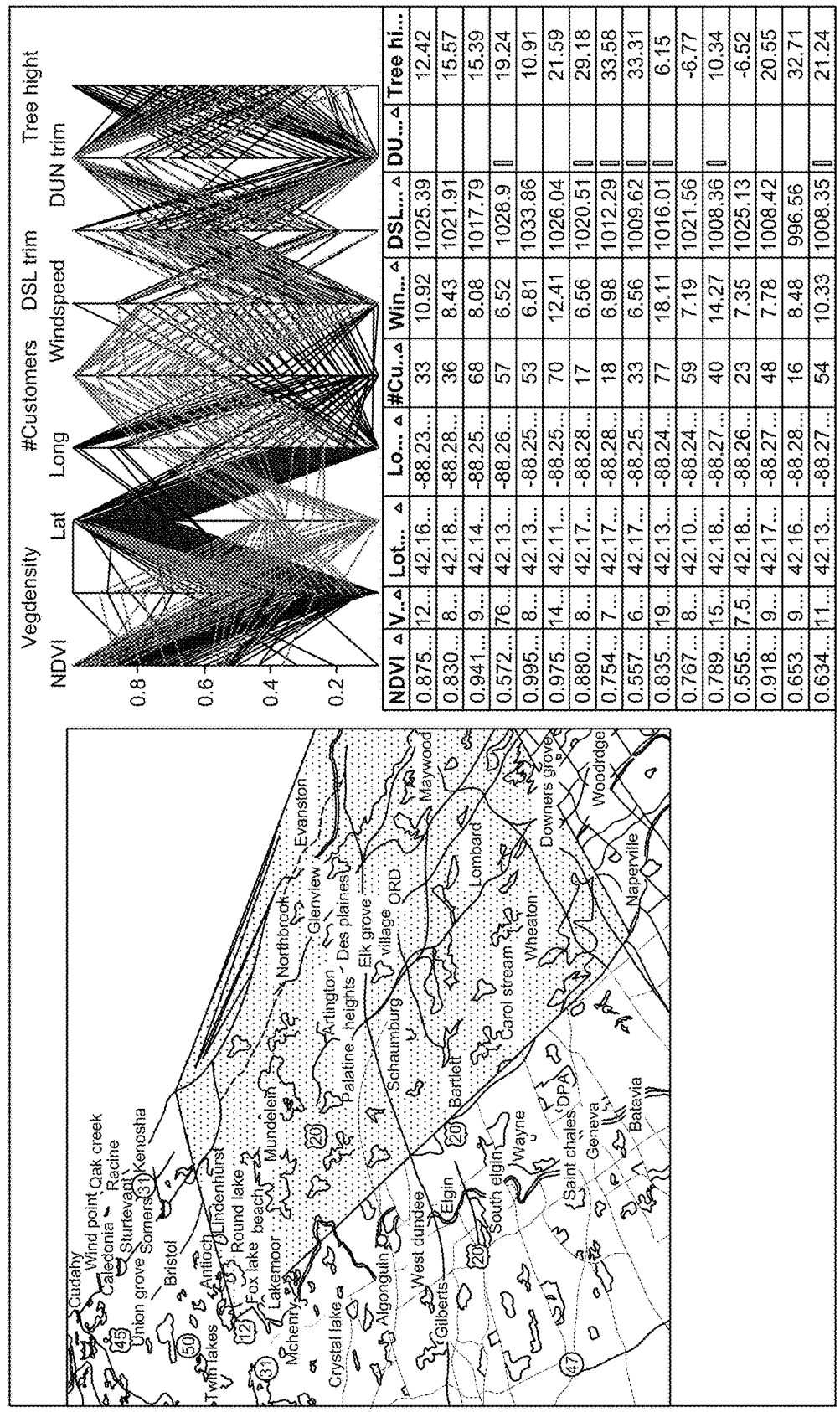
FIG. 11 illustrates a non-exhaustive example of a user interface according to some embodiments.

Each of FIGS. 3, 6-9 and 11 show three React components—the map, graph and table. The map may be referred to as a Mapbox React element. In FIG. 3, the map 303 may show the feeders 302 in a given AOI for a given operator. The operator may manipulate the map 303 or any aspect of the visualization 301 (e.g., graph 310 or table 312) to filter the data. The parameter(s) to filter on include, but are not limited to: NDVI, vegetation, latitude, longitude, number of customers affected; windspeed, tree height, last date trimmed and next trim, etc. In one or more embodiments, the operator may overlay the map 303 with one or more layers of feeder attribute data 216 based on selection of one or more tabs 314 or any other suitable selector. The tabs 314 may refer to layers including, but not limited to: HeatMap 2D-3D; ToggleHeatMap; SendExelonFeeders; SendMultiLinesCircuit; Tree-Segmentation; Toggle-PC-Tab; Satellite; BlueMap; DarkMap; etc. In one or more embodiments, additional visualization provided by the vegetation management module 202 may include right of way implementation and overlap with other circuits. For example, the map 802 in the user interface 801 provided in FIG. 8 shows the customers affected by outages 804 that happened on these feeders from the historical database, while FIG. 9 shows the visualization 901 of detected trees 902 encroaching on feeders, overlaid on real time satellite images. The visualization 301 may display the trees (FIG. 10A), may display the encroachments in the buffer zone in terms of vegetation height (FIGS. 10C and 10D), corresponding to a height heat map 1103 as shown in FIG. 11 or a vegetation heat map (FIG. 10B).

The graphs in FIGS. 3, 6-9 and 11 may be another React element that shows the parallel coordinate d3-based features wrapped in a React component. The tables in FIGS. 3, 6-9 and 11 may be a table element also wrapped in a React component. Each of the map, graph and table may be stand alone React components whereby each may provide a visualization of the data sent to it by the Redux component. The Redux component may distribute the data to the React component, and may provide for the synchronization of the visualization across elements. For example, when the operator selects a filter on the number of customers in the parallel coordinate graph 806, the parallel coordinate system may render the selected data and the associated data on the other independent variables in that same element, namely the NDVI associated to the place of the outage, the vegetation density at that location, the location itself, the wind speed at that location and other data related to the outages selected by the operator. At the same time, or substantially the same time, the Redux based component may distribute that same data to the Map 802 as well as to the table element 808 showing only on the map the selected outages, and showing on the table only those outages selected interactively by the user as well.

In one or more embodiments, the vegetation management module 202 may allow a real time interactive visualization that runs, as a non-exhaustive example, 30 frames per second, as the operator changes his filter selection in any of the elements. It is noted that as the operator is selecting the lower part of the number of customer axis in the graph 806 in FIG. 8, where the selection is indicated by the box 805 a heatmap is visualized on the map showing that one of the feeders holds more customers than the other. This interactivity and instantaneous visualization leads the user to make decisions, such as prioritizing trimming and vegetation management to the feeders that hold more customers, and this may be more impactful cost-wise, in case an outage occurs.

Turning back to the process 100, further analysis may be executed by the vegetation management module 202 in S130 based on the generated visualization 301. A non-exhaustive example of an output of the vegetation management module 202 is a training schedule 228. Examples of executable analysis include but are not limited to: scheduling and optimization algorithms, mobility applications, utility outage risk modeling/predictions, fire risk modeling, etc., may be executed.

Figure 2:
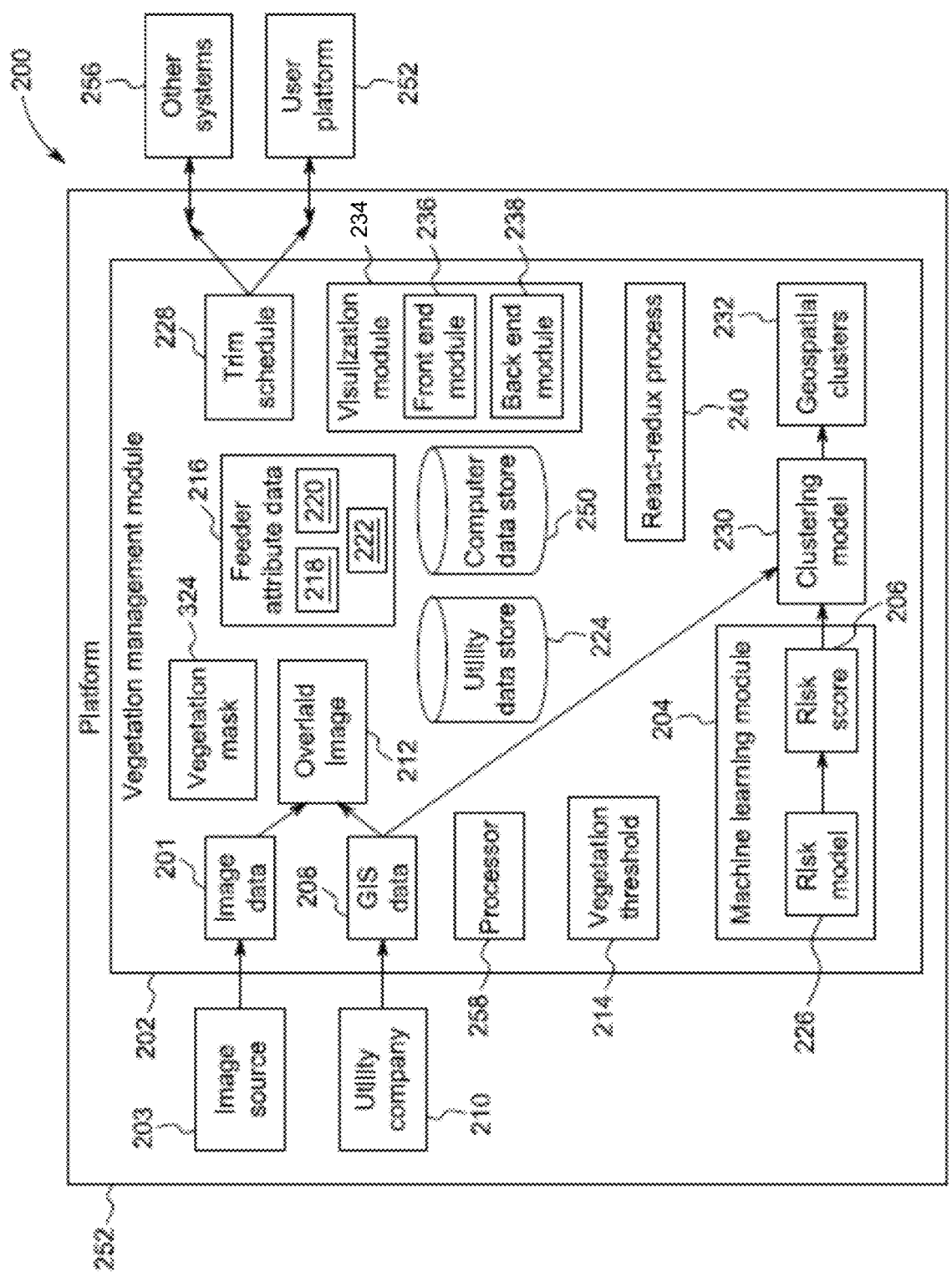
FIG. 2 illustrates block diagrams of a system architecture according to some embodiments.

It is noted that FIG. 2 represents a logical architecture for describing processes according to some embodiments, and actual implementations may include more or different components arranged in other manners. Embodiments are not limited to architecture 200.

Architecture 200 includes a vegetation management module 202, a data store 250 (e.g., database) and a user platform 252. In one or more embodiments, the vegetation management module 202 may reside on a platform 254. Platform 254 provides any suitable interfaces through which operators/other systems 256 may communicate with the vegetation management module 202.

In one or more embodiments, the output of the vegetation management module 202 may be output to a user platform 252 (a control system, a desktop computer, a laptop computer, a personal digital assistant, a tablet, a smartphone, etc.) to view information about the vegetation in an AOI. In one or more embodiments, the output from the vegetation management module 202 may be transmitted to various user platforms or to other system (256), as appropriate (e.g., for display to, and manipulation by, a user, further analysis and manipulation).

In one or more embodiments, the system 200 may include one or more processing elements 258 and a memory/computer data store 250. The processor 258 may, for example, be a microprocessor, and may operate to control the overall functioning of the vegetation management module 202. In one or more embodiments, the vegetation management module 202 may include a communication controller for allowing the processor 258 and hence the vegetation management module 202, to engage in communication over data networks with other devices (e.g., user platform 252 and other system 256).

In one or more embodiments, the system 200 may include one or more memory and/or data storage devices 250 that store data that may be used by the vegetation management module 202. The data stored in the data store 250 may be received from disparate hardware and software systems, some of which are not inter-operational with one another. The systems may comprise a back-end data environment employed by a business, industrial or personal context.

In one or more embodiments, the data store 250 may comprise any combination of one or more of a hard disk drive, RAM (random access memory), ROM (read only memory), flash memory, etc. The memory/data storage devices 250 may store software that programs the processor 258 and the vegetation management module 202 to perform functionality as described herein.

As used herein, devices, including those associated with the system 200 and any other devices described herein, may exchange information and transfer input and output ("communication") via any number of different systems. For example, wide area networks (WANs) and/or local area networks (LANs) may enable devices in the system to communicate with each other. In some embodiments, communication may be via the Internet, including a global internetwork formed by logical and physical connections between multiple WANs and/or LANs. Alternately, or additionally, communication may be via one or more telephone networks, cellular networks, a fiber-optic network, a satellite network, an infrared network, a radio frequency network, any other type of network that may be used to transmit information between devices, and/or one or more wired and/or wireless networks such as, but not limited to Bluetooth access points, wireless access points, IP-based networks, or the like. Communication may also be via servers that enable one type of network to interface with another type of network. Moreover, communication between any of the depicted devices may proceed over any one or more currently or hereafter-known transmission protocols, such as Asynchronous Transfer Mode (ATM), Internet Protocol (IP), Hypertext Transfer Protocol (HTTP) and Wireless Application Protocol (WAP).

A user may access the system 200 via one of the user platforms 252 (a control system, a desktop computer, a laptop computer, a personal digital assistant, a tablet, a smartphone, etc.) to view information about and/or manage the vegetation management in accordance with any of the embodiments described herein.

Figure 12:
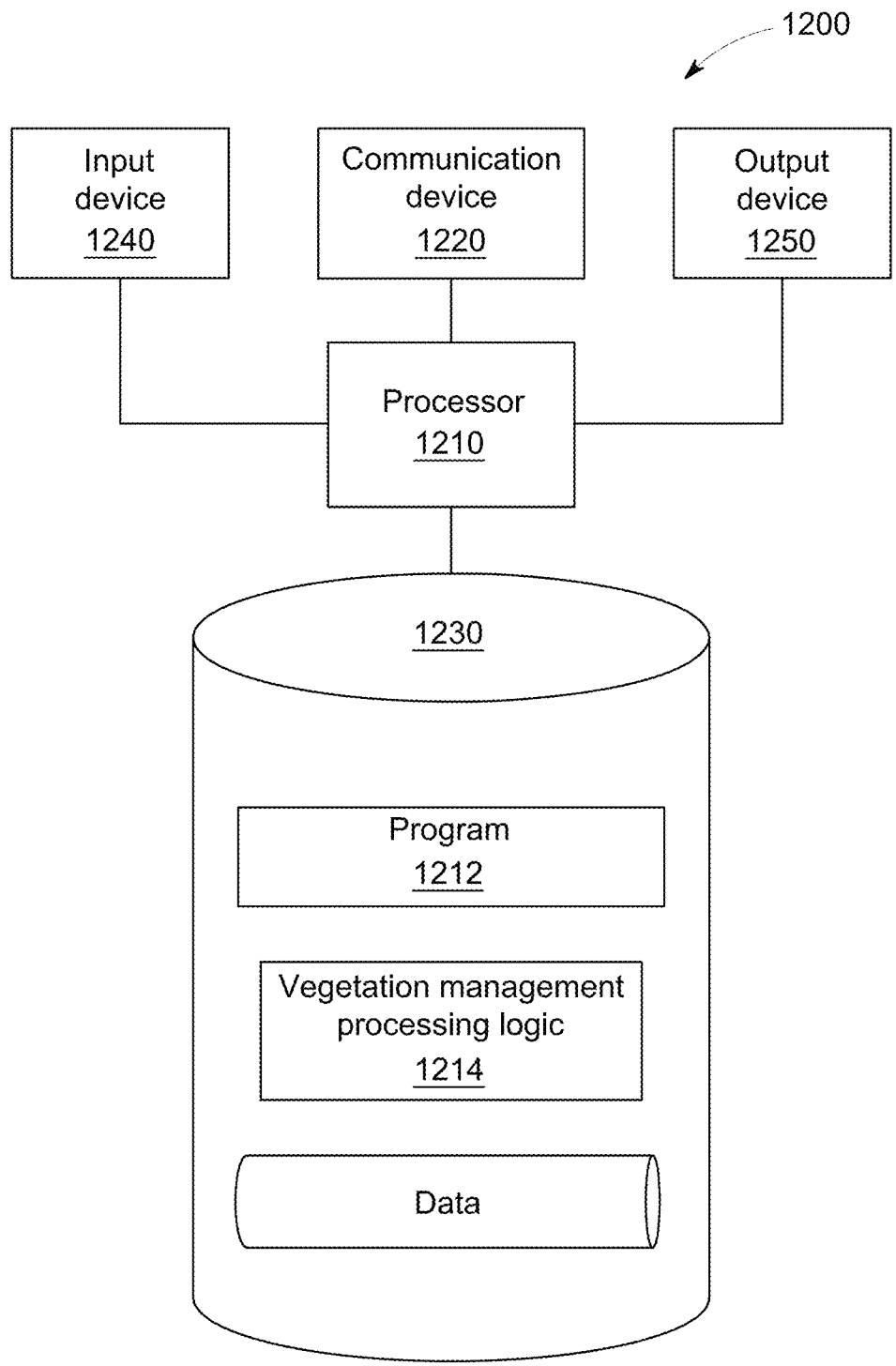
FIG. 12 illustrates a block diagram of a system according to some embodiments.

Note the embodiments described herein may be implemented using any number of different hardware configurations. For example, FIG. 12 illustrates a vegetation management platform 1200 that may be, for example, associated with the system 200 of FIG. 2. The vegetation management platform 1200 comprises a vegetation management processor 1210 ("processor"), such as one or more commercially available Central Processing Units (CPUs) and/or Graphical Processing Units (GPUs) in the form of one-chip microprocessors, coupled to a communication device 1220 configured to communicate via a communication network (not shown in FIG. 12). The communication device 1220 may be used to communicate, for example, with one or more users. The vegetation management platform 1200 further includes an input device 1240 (e.g., a mouse and/or keyboard to enter information) and an output device 1250 (e.g., to output the outcome of module execution).

The processor 1210 also communicates with a memory/storage device 630. The storage device 1230 may comprise any appropriate information storage device, including combinations of magnetic storage devices (e.g., a hard disk drive), optical storage devices, mobile telephones, and/or semiconductor memory devices. The storage device 1230 may store a program 1212 and/or vegetation management processing logic 1214 for controlling the processor 1210. The processor 1210 performs instructions of the programs 1212, 1214, and thereby operates in accordance with any of the embodiments described herein. For example, the processor 1210 may receive data and then may apply the instructions of the programs 1212, 1214 to determine location and height of vegetation for a feeder, as well as, a risk score for a given feeder.

The programs 1212, 1214 may be stored in a compressed, uncompiled and/or encrypted format. The programs 1212, 1214 may furthermore include other program elements, such as an operating system, a database management system, and/or device drivers used by the processor 1210 to interface with peripheral devices.

As used herein, information may be "received" by or "transmitted" to, for example: (i) the platform 1200 from another device; or (ii) a software application or module within the platform 1200 from another software application, module, or any other source.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein. The method steps can then be carried out using the distinct software modules and/or sub-modules of the system, as described above, executing on one or more hardware processors 1210 (FIG. 12). Further, a computer program product can include a computer-readable storage medium with code adapted to be implemented to carry out one or more method steps described herein, including the provision of the system with the distinct software modules.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

Those in the art will appreciate that various adaptations and modifications of the above-described embodiments can be configured without departing from the scope and spirit of the claims. Therefore, it is to be understood that the claims may be practiced other than as specifically described herein.

The invention claimed is:

1. A system comprising:
a vegetation management module to receive image data from an image source;
a memory for storing program instructions;
a vegetation management processor, coupled to the memory, and in communication with the vegetation module, and operative to execute program instructions to:
receive first image data and second image data for an area of interest;
overlay the first image data over the second image data to generate an overlaid image;
receive feeder attribute data for at least one feeder in the overlaid image, the feeder attribute data including at least a number of customers affected in the area of interest by outage of the at least one feeder;
generate a risk score for the at least one feeder based in part on the received feeder attribute data; and
generate a visualization based on the at least one feeder and the generated risk score.

2. The system of claim 1, further comprising program instructions to:
identify at least one feeder in the overlaid image that includes vegetation in a buffer zone for that feeder, wherein the identification of the at least one feeder is prior to receipt of the feeder attribute data.

3. The system of claim 2, further comprising program instructions to:
determine whether the vegetation in the buffer zone for the identified at least one feeder exceeds a threshold value.

4. The system of claim 1, wherein the first image data is satellite image data and the second image data is geographic information system (GIS) data, and the second image data is received from a utility company.

5. The system of claim 1, wherein the risk score predicts a risk of utility outage of the feeder.

6. The system of claim 1, further comprising program instructions to:
generate at least one geospatial cluster including two or more feeders.

7. The system of claim 6, wherein the feeders in the geospatial cluster include: 1. a same or similar risk score, and 2. are located in a same geographic location.

8. The system of claim 1, further comprising program instructions to:
generate a trim schedule for at least one feeder based on the generated risk score.

9. The system of claim 8, wherein the trim schedule includes a hot spot trim of the at least one feeder.

10. The system of claim 1, wherein the feeder attribute data is at least one of weather data, prior outage data, last trimming date data, next trimming date data, vegetation modelling analytics.

11. The system of claim 1, wherein the risk score is generated by a risk score model trained via a machine learning technique.

12. The system of claim 1, wherein the visualization is at least one of a map, a graph and a table.

13. A method comprising:
receiving first image data and second image data for an area of interest;
overlaying the first image data over the second image data to generate an overlaid image;
receiving feeder attribute data for at least one feeder in the overlaid image, the feeder attribute data including at least a number of customers affected in the area of interest by outage of the at least one feeder;
generating a risk score for the at least one feeder based in part on the received feeder attribute data;
generating a visualization based on the at least one feeder and the generated risk score; and
generating a trim schedule for at least one feeder based on the generated risk score.

14. The method of claim 13, further comprising:
identifying at least one feeder in the overlaid image that includes vegetation in a buffer zone for that feeder, wherein the identification of the at least one feeder is prior to receipt of the feeder attribute data.

15. The method of claim 13, further comprising:
determining whether the vegetation in the buffer zone for the identified at least one feeder exceeds a threshold value.

16. The method of claim 13, wherein the first image data is satellite image data and the second image data is geographic information system (GIS) data, and the second image data is received from a utility company.

17. The method of claim 13, wherein the risk score predicts a risk of utility outage of the feeder.

18. The method of claim 13, further comprising:
generating at least one geospatial cluster including two or more feeders, wherein the feeders in the geospatial cluster include: 1. a same or similar risk score, and 2. are located in a same geographic location.

19. A non-transitory, computer-readable medium storing instructions that, when executed by a computer processor, cause the computer processor to perform a method comprising:
receiving first image data and second image data for an area of interest;
overlaying the first image data over the second image data to generate an overlaid image;
receiving feeder attribute data for at least one feeder in the overlaid image, the feeder attribute data including at least a number of customers affected in the area of interest by outage of the at least one feeder;
generating a risk score for the at least one feeder based in part on the received feeder attribute data;
generating a visualization based on the at least one feeder and the generated risk score; and
generating a trim schedule for at least one feeder based on the generated risk score.

20. The medium of claim 19, further comprising:
generating at least one geospatial cluster including two or more feeders, wherein the feeders in the geospatial cluster include: 1. a same or similar risk score, and 2. are located in a same geographic location.

* * * * *